United States Patent
Ueyama et al.

[11] Patent Number: 6,134,057
[45] Date of Patent: Oct. 17, 2000

[54] DRIVE AND GUIDE MECHANISM AND APPARATUS USING THE MECHANISM

[75] Inventors: Masayuki Ueyama, Takarazuka; Kenji Mizumoto, Osaka, both of Japan

[73] Assignee: Minolta Co., Ltd., Osaka, Japan

[21] Appl. No.: 09/154,309

[22] Filed: Sep. 16, 1998

[30] Foreign Application Priority Data

| Sep. 17, 1997 | [JP] | Japan | 9-251905 |
| Feb. 12, 1998 | [JP] | Japan | 10-029420 |
| Feb. 12, 1998 | [JP] | Japan | 10-029461 |

[51] Int. Cl.[7] ............................. G02B 7/02; G02B 15/14
[52] U.S. Cl. .................... 359/821; 359/696; 359/823; 359/824
[58] Field of Search ................. 359/694, 695, 359/696, 821, 822, 823, 824

[56] References Cited

U.S. PATENT DOCUMENTS

| 5,016,993 | 5/1991 | Akitake | 359/696 |
| 5,029,992 | 7/1991 | Richardson | 359/696 |
| 5,140,468 | 8/1992 | Kayanuma | 359/699 |
| 5,150,260 | 9/1992 | Chigara | 359/694 |
| 5,225,941 | 7/1993 | Saito et al. | 359/824 |
| 5,587,846 | 12/1996 | Miyano et al. | 359/824 |

FOREIGN PATENT DOCUMENTS

| 5-022959 | 1/1993 | Japan . |
| 5-076186 | 3/1993 | Japan . |
| 5-091761 | 4/1993 | Japan . |

*Primary Examiner*—Ricky Mack
*Attorney, Agent, or Firm*—Sidley & Austin

[57] ABSTRACT

A lens driving device which does not make larger an apparatus in which the device is installed, which ensures a longer span for preventing a tilt of a lens therein, and which allows an easy access to the lens after assemblage is disclosed. The lens driving device includes a stationary board; a lens frame holding a lens group; a moving body like a flat plate one end of which is fixed to the lens frame in which the moving body is slid over the stationary board; and a rod, extending in an optical direction of the lens, which guides the moving body in the optical direction and is driven by a piezoelectric element. In the arrangement, the other end of the flat plate is frictionally held by the rod over a predetermined distance in the optical direction. When the piezoelectric element is supplied with a voltage with a predetermined waveform, the lens frame is driven in the direction of the optical axis by the moving body frictionally engaging the rod.

16 Claims, 17 Drawing Sheets

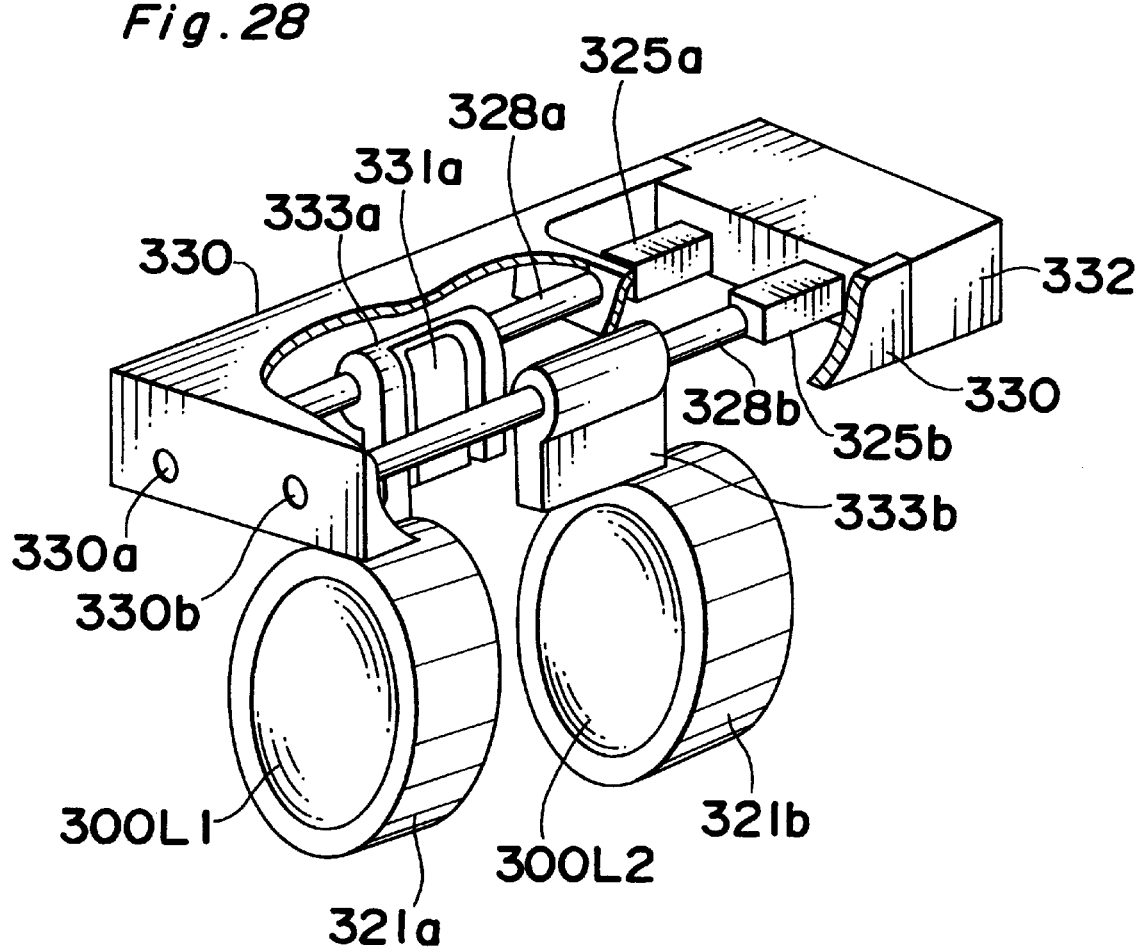

DRIVE AND GUIDE MECHANISM AND APPARATUS USING THE MECHANISM

This application is based upon applications Nos. 09-251905, 10-029420 and 10-029461 filed in Japan, the contents of which are hereby incorporated by reference.

BACKGROUND OF THE INVENTION

1. Field of the Invention

The present invention relates to an apparatus, such as an optical apparatus including binoculars, a camera including a digital camera and a video camera, and the like, and particularly relates to a drive mechanism, for example, for driving a lens and to a guide mechanism, for example, for guiding the lens, with which the apparatus is provided.

2. Description of the Related Arts

In the field of digital cameras, a more down-sized (i.e. miniaturized) and compact camera is desired in contrast with a conventional common camera. Meanwhile, as a drive mechanism for driving a lens used in the digital camera, there has been employed a cam mechanism as has been conventionally used in a common camera. That is, the digital camera has a construction in which a pin is fixed to a lens frame (or a movable frame), and in which a plurality of cam slots, engaging the same pin, are formed in a plurality of cylindrical members that engage and overlap one over the other. With the construction, a lens supported by the lens frame is driven in its optical axis.

However, even if one tries to downsize or miniaturize the cylindrical member having the cam slot and/or to downsize the pin engaging the cam slot, etc., there is a limitation to downsizing those components from a point of view of processing and/or assembling it. In other words, there arises a problem that the miniaturization of the cam mechanism can not catch up with the miniaturization of an optical system used therein.

Also, the cam mechanism is equipped with a tilt prevention mechanism for preventing a tilt of each lens advancing and retreating in its optical axis. With this arrangement, the movable frame for holding the lens advances and retreats while turning about the optical axis. Therefore, in case that one tries to miniaturize it while realizing a prevention of mutual interference of the plurality of movable frames, it is difficult to let a span of the tilt prevention mechanism be longer. As a result, a prevention of the tilt of the lens becomes difficult.

Furthermore, in the conventional cam mechanism, each lens is accommodated inside the cylindrical member. Therefore, it is difficult to perform the alignment of the optical system after assemblage thereof.

On the other hand, conventionally, a camera, video camera, digital camera, or the like, has had a guide mechanism for guiding a lens in a direction of an optical axis thereof at a time of moving the lens for zooming, focussing, etc. upon photographing. In the construction, there has been conventionally provided, for example, an MR (magnetic resistance) sensor for detecting a position of the lens that is driven in the optical direction, in order to control the position thereof. This MR sensor is a magnetic sensor, which is a magneto-resistive sensor having a characteristic that its resistance varies in a magnetic field when the intensity of the magnetic field varies. That is, the MR sensor moves in a longitudinal direction nearby a magnetized plate in which there are arranged a plurality of N- and S-poles alternately, with which arrangement the position of an object connected to the MR sensor is detected by reading the state of the magnetic field.

In this construction, in order to enhance an ability of the detection, it is necessary to ensure an accuracy of mutual location and mutual structures between the MR sensor and its counterpart magnetized plate. In this construction, a gap between a sensor surface of the MR sensor and the magnetized plate opposing the sensor surface thereof must be most strictly taken care of in order to ensure the accuracy thereof. However, the MR sensor and the magnetized plate are mounted on separated members moving relative to each other. Therefore, generally speaking, it is difficult to ensure the accuracy of the gap therebetween, only by the accuracy of components employed in the structure and/or by the accuracy of assemblage thereof.

In order to solve this technical problem, it has been practiced that, for example, a spacer or the like having a thickness corresponding to a required gap therebetween is inserted between the MR sensor and the magnetized plate, and that one of the MR sensor and the magnetized plate is brought into a press contact with the other thereof by means of a plate spring, or the like, by which the accuracy of the gap is ensured.

Meanwhile, in a type where the lens frame is hung down by a guide shaft, the lens frame is driven along the guide shaft in the direction of the optical axis. In this arrangement, however, it is necessary to restrict or prevent the turning of the lens frame around the guide shaft. In order to prevent the turning thereof, it has been practiced that an additional guide shaft is provided parallel to the foregoing guide shaft in which the additional guide shaft is fitted to a groove, or the like, that is additionally provided on the lens frame.

In this construction, in case that the optical performance thereof is considerably degraded due to swinging of the center of the optical axis of the lens frame, it is necessary to further suppress the play or looseness between the groove of the lens frame and the additional guide shaft, and the lens frame is biased on one side relative to the additional guide shaft by means of a spring, etc.

However, in the above construction, there are installed the detector for detecting the position of the lens and the mechanism for restricting or preventing the turning of the lens separately, in the guide mechanism for guiding the lens. This leads to an increment of the number of component parts and the number of assembling steps, which in turn incurs a large-sized apparatus and/or a high cost of production.

On the other hand, there has been conventionally provided, for example, a drive mechanism employing a piezoelectric element. The drive mechanism has a plurality of driving parts for linearly driving a plurality of lenses, for instance. With reference to FIG. 25 illustrating a drive mechanism for driving a lens in a camera, it is explained about the drive mechanism.

FIG. 25 is a perspective view of the drive mechanism for driving the lens. The lens drive mechanism has a lens frame 321a for holding a lens 300L1; a shaft bearing part 333a connected to the lens frame 321a; a guide shaft 328a, extending in a direction of the optical axis, slidably engaging the shaft bearing part 333a for guiding the lens frame 321a in the direction thereof; a lens frame 321b for holding a lens 300L2; a shaft bearing part 333b connected to the lens frame 321b; a guide shaft 328b, extending in the direction of the optical axis, slidably engaging the shaft bearing part 333b for guiding the lens frame 321b in the direction thereof.

The guide shaft 328a is held near a front end portion and a rear end portion of the guide shaft 328a by a hole portion 330a formed on a front wall 330f of a stationary frame 330 and by a hole portion 330a' formed on a middle wall 330m of the stationary member 330, so that the front end portion and the rear end portion of the guide shaft 328a slidably engage the stationary frame 330.

In the same way, the guide shaft 328b is held near a front end portion and a rear end portion of the guide shaft 328b by a hole portion 330b formed on the front wall 330f of the stationary frame 330 and by a hole portion 330b' (unshown in the figure) formed on the middle wall 330m of the stationary member 330, so that the front end portion and the rear end portion of the guide shaft 328b slidably engage the stationary frame 330.

Each of the shaft bearing parts 333a, 333b is equipped with a plate-spring-like holding plate 331a, 331b which is mounted thereto respectively with a screw (the holding plate 331b is hidden in the figure). The holding plates 331a, 331b make press connect with the guide shafts 328a, 328b, respectively. Therefore, when the lens frames 321a, 321b move on the guide shafts 328a, 328b, the shaft bearing parts 333a, 333b are slid thereon frictionally.

As shown in FIG. 25, the drive mechanism also has a pair of piezoelectric elements 325a, 325b that are mounted to the rear end portions of the guide shafts 328a, 328b. Rear end portions of the piezoelectric elements 325a, 325b are connected to fixing members 332a, 332b, respectively. These fixing members 332a, 332b are fixed to a rear end surface 330c of the stationary frame 330.

The principle of operation of a drive mechanism employing a piezoelectric element is briefly explained below with reference to schematic views shown in FIGS. 26(A), 26(B), 26(C).

As shown in FIG. 26(A), a driving shaft 353 is fixed to one end of a piezoelectric element 352, a fixing member 351 is fixed to the other end of the piezoelectric element 352, and a moving body 354 to be moved is held relative to the driving shaft 353 by a frictional force exerted by a spring for instance. The mass of the fixing member 351 is sufficiently large as compared with the mass of the moving body 354.

When a predetermined voltage is applied to the piezoelectric element 352, the piezoelectric element 352 is inhibited from expanding toward the fixing member 351 due to the force of inertia of the fixing member 351. Therefore the piezoelectric element 352 expands toward the driving shaft 353, causing the driving shaft 353 to be moved leftward in the figure.

In this operation, when the applied voltage is on a gentle rise as shown by part "A1" in FIG. 27, the moving body 354 moves together with the driving shaft 353 by a distance x because the frictional force exerting between the moving body 354 and the driving shaft 353 is larger than the force of inertia of the moving body 354, as shown in FIG. 26(B).

Next, when a voltage of an abrupt fall as shown by part "B1" in FIG. 27 is applied to the piezoelectric element 352, the force of inertia of the moving body 354 is larger than the frictional force exerting therebetween, while the piezoelectric element 352 is contracted. Therefore, at this time, the moving body 354 remains stationary, while only the driving shaft 353 contracts back to its original length so that it moves back by the same distance "x" to the original position, as shown in FIG. 26(C).

Applying a voltage with a sawtooth-shaped pulse waveform to the piezoelectric element 352 so that the aforementioned operation is repeated, allows the moving of body 354 to a desired position. By the way, in order to move the moving body 354 in a reverse direction, a voltage having an abrupt rise and a gentle fall is applied to the piezoelectric element 352.

The drive mechanism, as shown in FIG. 25, is actuated on a basis of the same principle of operation. That is, when a voltage with a predetermined sawtooth-shaped pulse waveform is applied repeatedly to the piezoelectric elements 325a, 325b for a specified time, the piezoelectric elements 325a, 325b expands and contracts so that the lens 300L1, 300L2 is moved toward a desired position, under a relation between the frictional force exerting between the guide shaft 328a, 328b and the holding plate 331a, 331b, and the force of inertia due to the mass of both the lens 300L1, 300L2 and the lens frame 321a, 321b.

However, in case that the drive mechanism is miniaturized with the miniaturization of the camera main body, the mass of the fixing member 332a, 332b is reduced; therefore, the force of inertia is also reduced. This may cause the fixing member 332a, 332b to move against the expansion and contraction of the piezoelectric elements 325a, 325b. That is, in case that the stationary frame 330 is made of an elastically deformable material such as plastic, the rear end surface 330c becomes easily flexible, so that this rear end surface 330c accompanies the movement of the fixing members 332a, 332b. In other words, in case that the stationary frame 330 is made of such an elastically deformable material, the rear end surface 330c has not enough rigidity not to allow the fixing member 332a, 332b to move.

SUMMARY OF THE INVENTION

Accordingly, it is an object of the present invention to provide an apparatus having a drive mechanism for driving a moving body in a predetermined direction relative to a stationary member which remains stationary with respect to a body of the apparatus, in which a miniaturization of the drive mechanism is realized, it is easy to make an access to the moving body after assembling the apparatus, and also it is possible to assure a longer span thereof for preventing a tilt of the moving body relative to the predetermined direction.

It is another object of the present invention to provide an apparatus having a guide mechanism for guiding a moving body, in which the guide mechanism has a function to detect the location of the moving body relative to the guide member, to prevent a rotation of the moving body about the guide member, and to remove a play or looseness between the moving body and the guide member, and in which it is possible to reduce the number of assembling parts of the guide mechanism and the number of its assembling steps, in order to realize a miniaturization of the guide mechanism and to realize a low cost of production.

It is still another object of the present invention to provide an apparatus having a drive mechanism for driving a plurality of moving bodies relative to a stationary member which is fixed to a frame, in which each of the moving bodies is moved stably.

In accomplishing these and other objects of the present invention, according to one aspect thereof, there is provided an apparatus comprising: a body; a moving body that is movable in a predetermined direction relative to the body; a stationary member that remains stationary relative to the body and that extends in the predetermined direction; and a plate-like member that is connected to the moving body and that is slidable relative to the stationary member in the predetermined direction with a surface of the plate-like member contacting a surface of the stationary member.

The apparatus may be an optical apparatus including a camera, or may be other apparatus that are used in technical fields different from the optical field.

For example, in case that the apparatus is the camera, the moving body may be a lens frame for holding a lens or lens group, and the predetermined direction may be a direction of an optical axis of the lens or the lens group. In the arrangement, there is no need of a plurality of cylindrical members which overlap one over the other like those employed in the conventional camera as mentioned above; therefore, a diameter of a lens accommodating part does not exceed a diameter of the lens frame. Namely, the miniaturization of the drive mechanism with the moving body is realized. Also, in the arrangement, a lens is not covered with such conventional cylindrical members one over the other; therefore, it is easy to make the access to the lens or lens group as the moving body after the assemblage of the apparatus, and it is easy to align a center of the lens or lens group as the moving body relative to the optical axis. Further, for example, in case that a plurality of lenses or lens groups as the moving bodies are provided so as to move respectively in the optical axis, the lenses or lens groups are fixed to a plurality of plate-like members, respectively, and the plurality of the plate-like members are provided offset from each other in a direction perpendicular to the optical direction, for example. With the arrangement, the plurality of loci of the moving bodies does not interfere with each other; therefore, it is possible to assure respective longer spans thereof enough to prevent the tilt of the moving bodies relative to the optical axis.

According to another aspect of the present invention, there is provided an apparatus comprising: a moving body; a guide member that guides the moving body in a direction in which the guide member extends and that makes a position, or posture, of the moving body stable at a desired location in the direction; an MR sensor that detects the desired location of the moving body in the direction; a magnetized member that cooperates with the MR sensor to detect the desired location of the moving body in the direction; and a biasing member that biases the moving body toward the guide member and that biases the MR sensor toward the magnetized member.

The apparatus may be an optical apparatus including a camera, or may be other apparatus that are used in technical fields different from the optical field.

For example, in case that the apparatus is the camera, the moving body may be a lens frame for holding a lens or lens group. According to the arrangement, the guide mechanism has a function to detect the location of the moving body relative to the guide member by a cooperation of the MR sensor and the magnetized member; the guide mechanism has a function to prevent a rotation of the moving body about the guide member because the guide member makes the position, or posture, of the moving body stable at the desired location in the direction; and the guide mechanism has a function to remove the play or looseness between the moving body and the guide member because the moving body is biased against the guide member by the biasing force exerted by the biasing member. Also, according to the arrangement, it is possible to reduce the number of assembling parts of the guide mechanism and the number of its assembling steps, because there is no need of providing separate members for detecting the position of the moving body relative to the guide member and for preventing or regulating the rotation of the moving body about the guide member, unlike the aforementioned conventional art. With the simple arrangement, the miniaturization of the guide mechanism and the low cost of production thereof are realized.

According to still another aspect of the present invention, there is provided an apparatus comprising: a frame; a stationary member that is fixed to the frame; a plurality of electromechanical transducers each of which has a pair of ends, in which one of the ends of each of the electromechanical transducers is fixed to the stationary member, and in which the other of the ends thereof expands and contracts with respect to the stationary member; a plurality of drive members each of which is fixed to the other of the ends of each of the electromechanical transducers; and a plurality of moving bodies each of which frictionally engages one of the drive members.

The apparatus may be an optical apparatus including a camera, or may be other apparatus that are used in technical fields different from the optical field.

For example, in case that the apparatus is the camera, the moving body may be a lens frame for holding a lens or lens group.

According to the arrangement, for example, each drive member reciprocates in response to the expansion and contraction of each of the electromechanical transducers. At this time, in compliance with a voltage with, for example, a waveform having a rapid rise and a gentle fall, each moving body is driven along the drive member. In the operation, there is provided a common stationary member for the plurality of electromechanical transducers and the plurality of drive members. Namely, the common stationary member has a large mass. Therefore, each of the drive members reciprocates without loss of the amount of the reciprocation, so that the moving body is driven stably. Thus, even if the drive mechanism is downsized or miniaturized, a precision of positioning the moving body relative to the frame or the stationary member is not deteriorated.

BRIEF DESCRIPTION OF THE DRAWINGS

These and other objects and features of the present invention will become clear from the following description taken in conjunction with the preferred embodiments thereof with reference to the accompanying drawings, in which:

FIG. 28 is a perspective view showing a drive mechanism for driving a lens which is applied to the camera according to a sixth embodiment of the present invention.

DETAILED DESCRIPTION OF THE PREFERRED EMBODIMENTS

Figure 1:
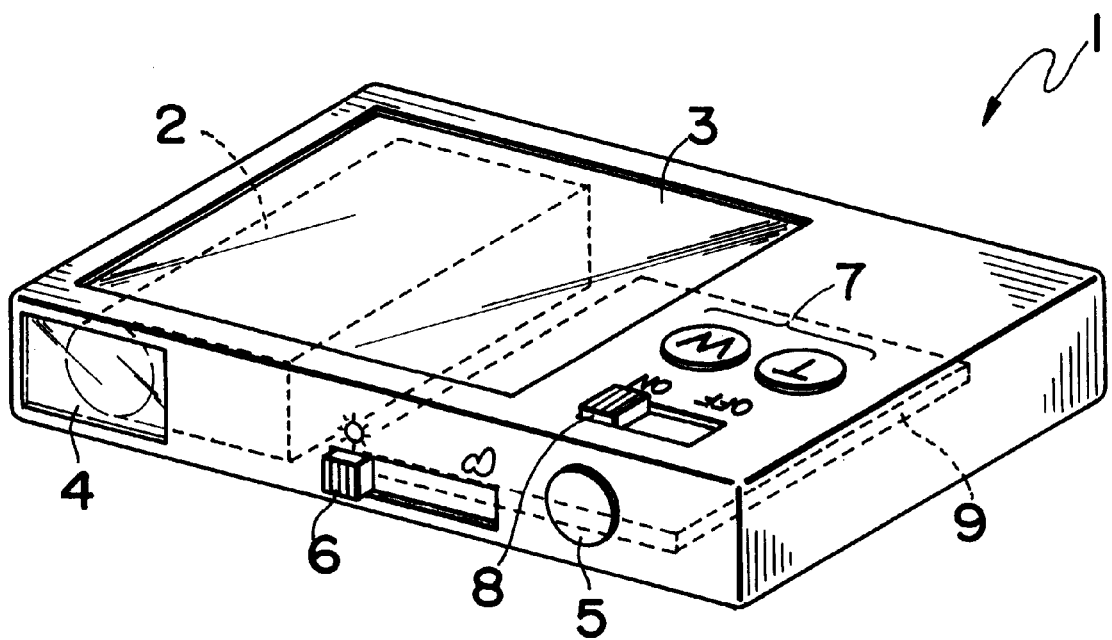
FIG. 1 is a perspective view of a digital camera, in which there is installed a drive mechanism for driving a lens, according to an embodiment of the present invention.

Before the description of the preferred embodiments proceeds, it is to be noted that like or corresponding parts are designated by like reference numerals throughout the accompanying drawings.

Referring to FIGS. 1 through 24 and FIGS. 26 though 28, a description is made below on cameras according to six embodiments of the present invention.

First, referring to FIGS. 1 through 7, the description is made on a digital camera with a drive mechanism according to a first embodiment of the present invention and a modification to the first embodiment.

FIG. 1 is a schematic view showing a general arrangement of the digital camera 1 which is provided with the drive mechanism for driving a lens thereof. A liquid crystal monitor 3 is provided on top of a camera body, and an image picked up by a CCD 2b (see FIG. 3) provided on an optical unit 2 is displayed on this monitor 3. When the user presses a shutter operation button or shutter release button 5 while viewing the liquid crystal monitor 3, the image displayed at the time is recorded on a flash memory in a circuit board 9.

Figure 2:
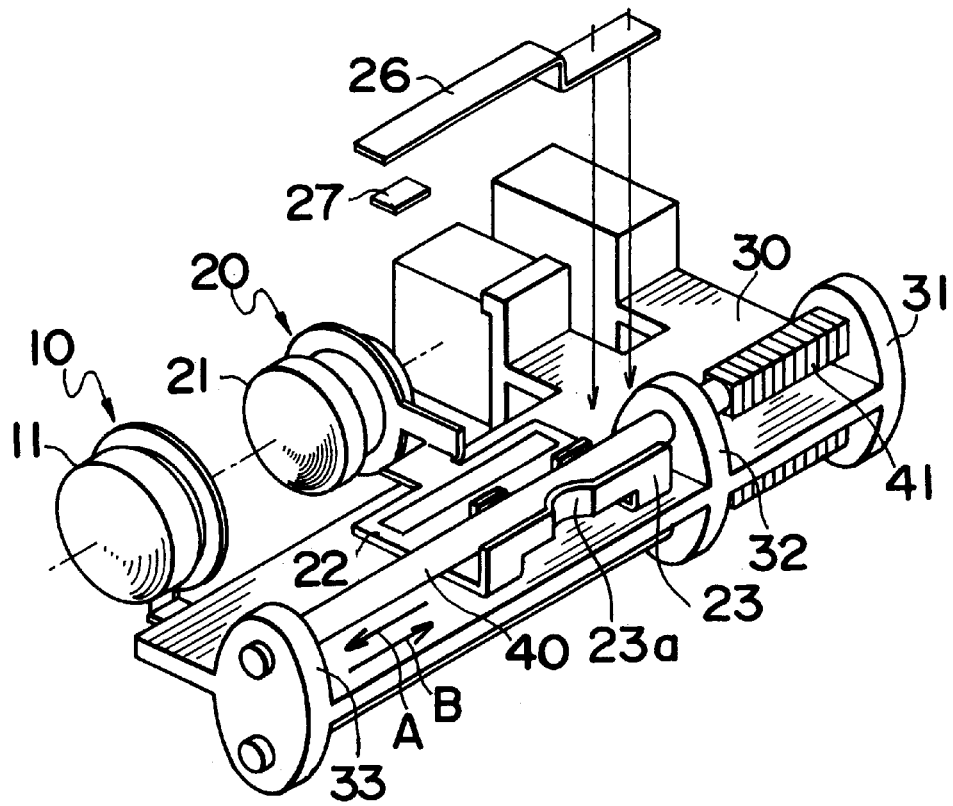
FIG. 2 is a perspective view showing the drive mechanism for driving the lens which is applied to the digital camera according to a first embodiment of the present invention.
Figure 3:
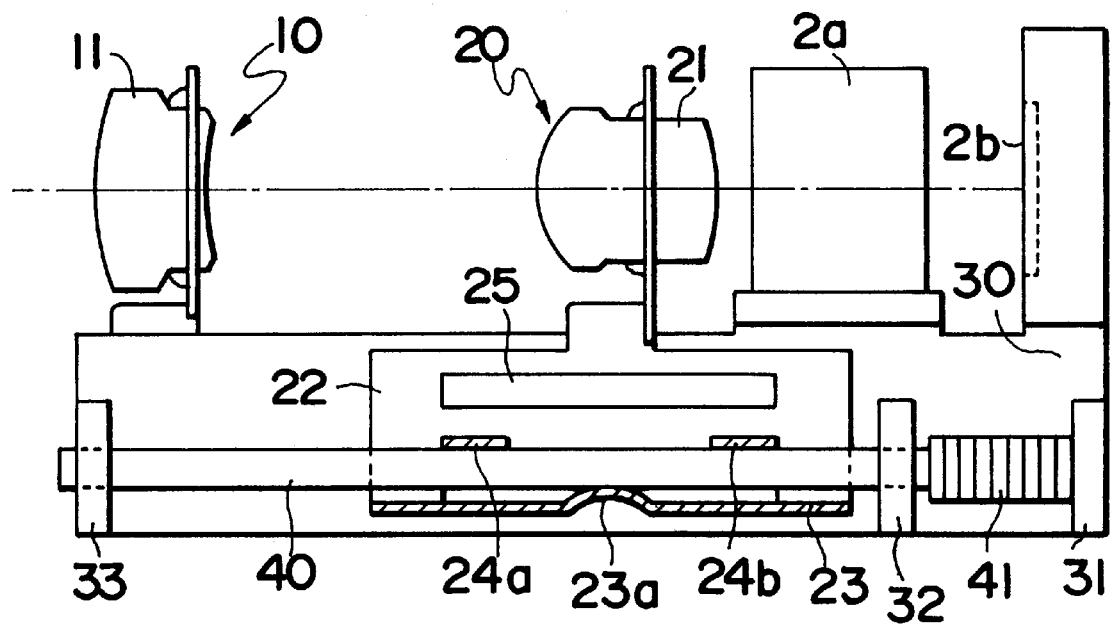
FIG. 3 is a plan view of the drive mechanism for driving the lens shown in FIG. 2, as viewed from the top thereof.

The optical unit 2 is shown in FIGS. 2 and 3. FIG. 2 shows a perspective view of the drive mechanism for driving the lens provided in the optical unit 2, and FIG. 3 shows a plan view of the drive mechanism as viewed from the top side. The digital camera 1 has a zoom function, and the optical unit 2 has a first lens group 10 and a second lens group 20 which are movable relative to each other. Lens frames of these lens groups are connected to flat moving bodies each of which slides and moves with keeping in surface contact with the stationary board 30. That is, as the flat moving body slides and moves over the stationary board 30, each lens group 10, 20 moves linearly in a direction of its optical axis. The flat moving body is driven by a piezoelectric element 41 as an electromechanical transducer.

On the top surface of the stationary board 30 that is immovably fixed to the main body of the digital camera 1, three semicircular-disc-shaped support portions 31, 32, 33 protruding upwardly from the stationary board 30 are provided with spacings between adjacent support portions 31, 32, 33. One end of a piezoelectric element 41 is adhesively fixed to the side face of the rightmost support portion 31, as shown in FIG. 2. The leftmost support portion 33 and the central support portion 32 have through holes, respectively, and a guide shaft 40 is slidably inserted into these two through holes. One end of the guide shaft 40 is adhesively fixed to the other end of the piezoelectric element 41. The piezoelectric element 41 is a kind of electromechanical transducer comprising a multiplicity of laminated piezoelectric plates.

The moving body 22 is a member which is flat in shape as a whole, and which frictionally engages with the guide shaft 40. That is, a central portion of a side wall 23 which is formed by folding back an edge part of one side of the moving body 22 at a right angle relative to a base of the moving body 22, is constructed as a pressing portion 23a having an elasticity; and two contact portions 24a, 24b formed as to face the side wall 23 and the pressing portion 23a, of the side wall 23 elastically support the guide shaft 40.

Figure 4:
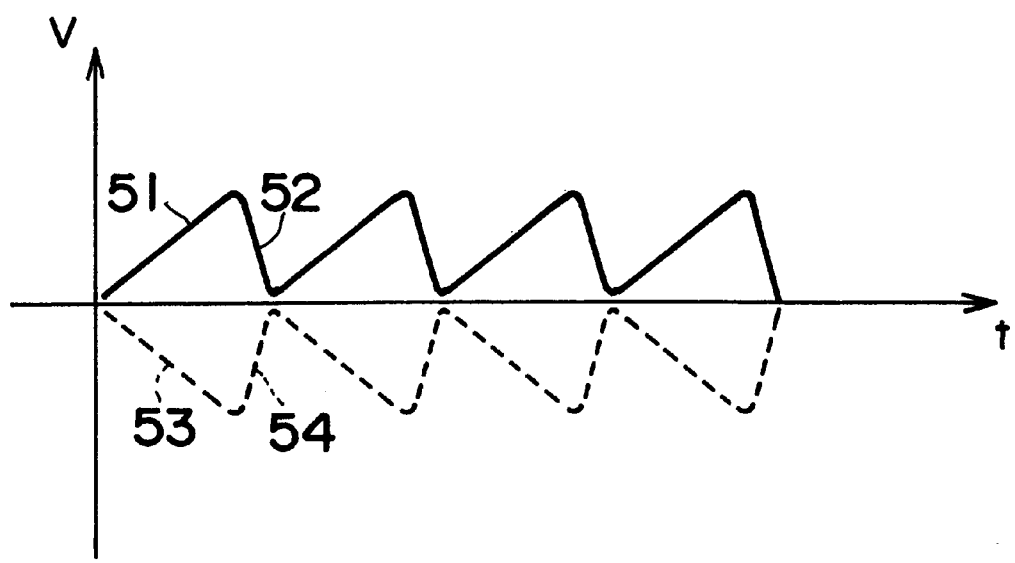
FIG. 4 is a graph showing a waveform of a voltage fed to the piezoelectric element of the drive mechanism for driving the lens of FIG. 2.
Figure 5:
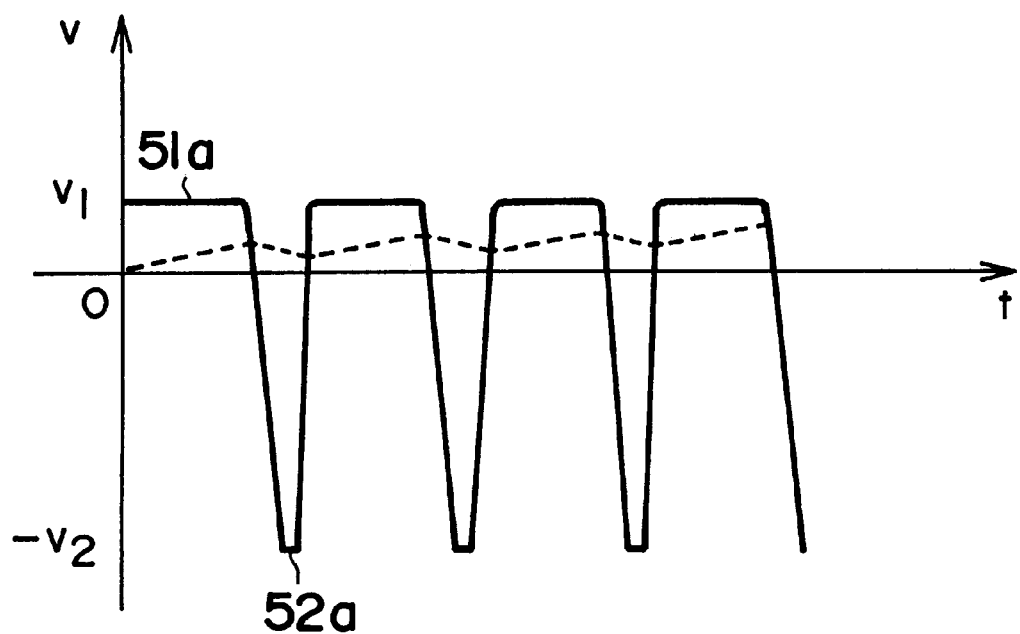
FIG. 5 is a graph showing a moving velocity of the guide shaft when the voltage shown by the waveform of FIG. 4 is fed to the piezoelectric element.

When a fluctuating voltage with a sawtooth-shaped waveform as shown by a solid line in FIG. 4 is continuously applied to the piezoelectric element 41, the piezoelectric element 41 oscillates (i.e. expands and contracts). Accompanying this movement, the guide shaft 40 oscillates in a direction of its length. FIG. 5 is a graph showing a moving velocity of the guide shaft 40 when the guide shaft 40 oscillates. A velocity of the guide shaft 40 with a plus value in FIG. 5 corresponds to the movement of the rod 40 in a direction of A (toward a front of the camera) in FIG. 2.

When the piezoelectric element 41 expands relatively slowly for a gently rising slope 51 of the voltage waveform shown by the solid line in FIG. 4, the guide shaft 40 moves slowly in the direction of "A" in FIG. 2.

Meanwhile, for an abrupt falling slope 52 of the voltage, the piezoelectric element 41 abruptly contracts to return to the initial length, so that the guide shaft 40 also abruptly moves back in the direction of "B". When such a voltage is repeatedly applied to the piezoelectric element 41, the guide shaft 40 oscillates so as to repeat the slow movement in the direction of "A" (a velocity "$v_1$" in FIG. 5) and the abrupt movement in the direction of "B" (a velocity "$-v_2$" in FIG. 5).

In the construction, the elasticity of the pressing portion 23a of the moving body 22 (i.e. frictional coupling force between the moving body 22 and the guide shaft 40) is so adjusted that the moving body 22 moves together with the guide shaft 40 when the guide shaft 40 moves slowly, and that the moving body 22 remains stationary by its force of inertia thereof when the guide shaft 40 abruptly moves.

Accordingly, when the predetermined voltage is applied to the piezoelectric element 41, the guide shaft 40 oscillates so that the moving body 22 moves in the direction of "A" relatively to the stationary board 30 (the velocity of the moving body 22 in this case is shown by a broken line in FIG. 5).

Meanwhile, in order to move the moving body 22 in the direction of "B", a fluctuating voltage having a gentle falling slope 53 and an abruptly rising slope 54 as shown by a broken line in FIG. 4 may be continuously applied to the piezoelectric element 41.

Because of a very small amplitude of the guide shaft 40, the travelling amount of the moving body 22 corresponding to the voltage of one pulse is very small. Therefore, the position of the lens groups can be controlled with higher precision.

On top surface of the moving body 22, an elongated magnet scale 25, or magnetized plate, is provided so as to extend parallel to the guide shaft 40. This magnet scale 25 is magnetized with a pattern of S- and N-poles alternately positioned at a pitch of several tens of $\mu$m lengthwise. Meanwhile, an MR sensor 27 is fixed to a tip of a plate spring 26 one end of which is fixed to the top surface of the stationary board 30. The MR sensor 27 is kept in press contact with the magnet scale 25 by the resilient force of the plate spring 26. Therefore, as the moving body 22 moves, the MR sensor 27 slides on the magnet scale 25 so that the MR sensor 27 outputs a two-phase signal. Thus, by using this output signal, the amount and the moving direction of the moving body 22 can be detected.

The pressing portion 23a and the pair of contact portions 24a and 24b, for frictionally engaging the guide shaft 40, serve as a tilt preventing mechanism for preventing the lens group 20 from tilting with respect to the optical axis of the lens groups 10, 20. Accordingly, the more the distance between the contact portions 24a and 24b is, the more preferable it is as the tilt preventing mechanism.

On the other hand, the first lens group 10 is also driven by a mechanism similar to that of the second lens group 20. The mechanism for driving the first lens group 10 is installed on the rear side of the stationary board 30 in FIG. 2, and is similar to that for driving the second lens group 20.

Figure 6:
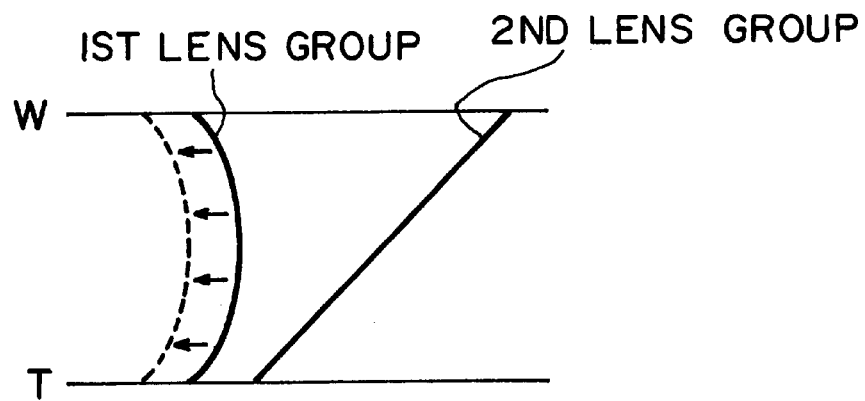
FIG. 6 is a graph showing a pair of zooming curves of two lens groups shown in FIG. 2.

FIG. 6 shows a zooming curve of each of the first and second lens groups at time of zooming. When the first lens group is forwarded as shown by an arrow in FIG. 6, a focusing operation can also be realized.

As apparent from FIG. 2, because no cylindrical member is used in the drive mechanism according to the embodiment, it is easy to make an access to the lens in a direction perpendicular to the optical axis thereof even after the optical unit is assembled. This facilitates the alignment of the lenses relative to each other. This advantage is also true of the embodiments explained below.

Figure 7:
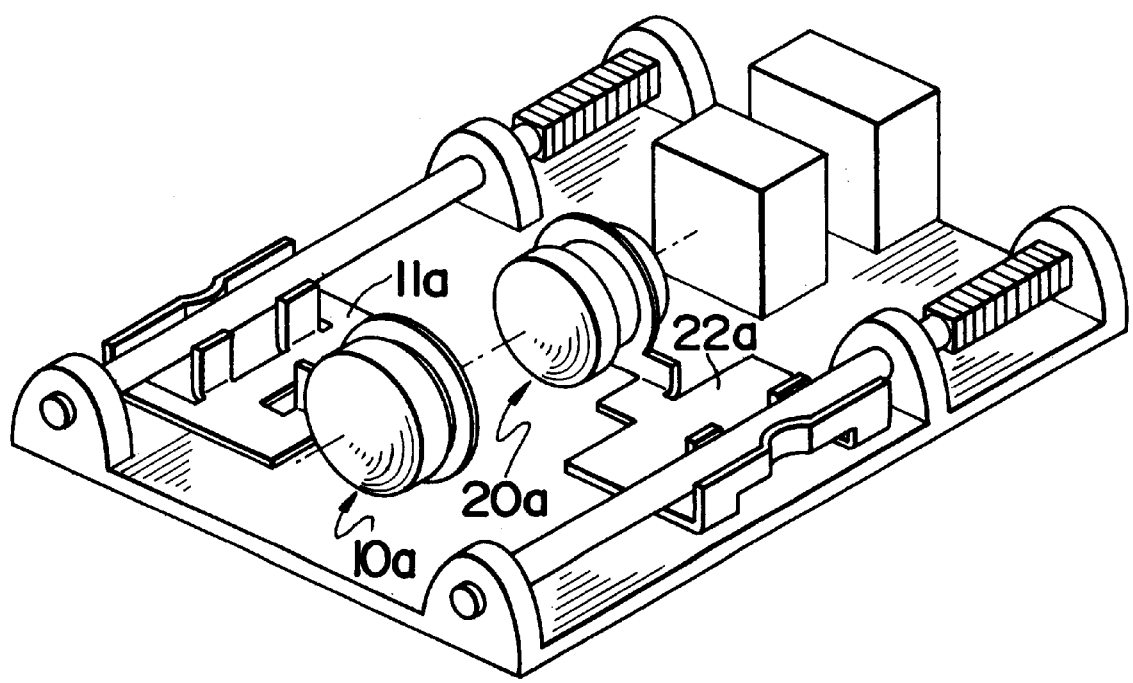
FIG. 7 is a perspective view showing a modification to the drive mechanism for driving the lens shown in FIG. 2.

FIG. 7 illustrates a modification to the first embodiment.

Namely, in the embodiment shown in FIGS. 2 and 3, driving devices for driving the first and second lens groups 10, 20 in the drive mechanism are provided on both sides of the stationary board 30. In the modification of FIG. 7, driving devices for driving the lens groups 10a, 20a are provided on one side of the stationary board so that they are opposing to each other. By the way, the rest of the arrangement of this modification is the same as that of the embodiment described in FIGS. 2 and 3.

In the first embodiment and its modification described above, the pair of two lens groups 10, 20 move relative to the stationary board 30 in the direction of the optical axis. Alternatively, one of the lens groups may be fixed to the camera body, and only the other thereof may be allowed to move. Alternatively, it is also possible to provide the drive mechanism with three or more movable lens groups. For example, a combination of the construction shown in FIG. 2 and the construction shown in FIG. 7 to each other leads to a drive mechanism having four movable lenses.

In case that there are provided more than two lens groups on the drive mechanism, the flat moving bodies connected to the individual lens groups are frictionally engaged with separate rods (guide shafts). That is, in each of the constructions shown in FIGS. 2 and 7, the number of rods is equal to the number of the moving bodies. The purpose of this arrangement is for mounting the individual moving bodies so as to be spaced a predetermined distance from one another in a direction perpendicular to the direction of the optical axis. With this construction, a plurality of moving bodies are prevented from moving on a single straight line; namely, the moving loci of the respective moving bodies are prevented from overlapping each other. Therefore, it is possible to allow enough length or pass in the optical direction for each moving body. In other words, it is possible to make sufficiently larger the mutual distance between the contact portions 24a, 24b which are provided as the mechanism for preventing the lens group from tilting relative to its optical axis.

Next, referring to FIG. 4 and FIGS. 8 through 10, the description is made on a digital camera with a drive mechanism according to a second embodiment of the present invention and a modification to the second embodiment.

A moving body connected to the lens frame of the lens group, and a driving device for driving the lens frame in the drive mechanism, according to the second embodiment, is different from those according to the first embodiment.

Namely, on a top surface of a stationary board 60, a pair of semicircular support portions 61, 62 protruding upwardly from the board 60 are provided with a predetermined spacing therebetween in a direction of the optical axis of the lens group. Between these support portions 61, 62, a pair of piezoelectric elements 80, 81, with an oscillator 83 provided therebetween, are supported. That is, one of the piezoelectric elements (element 81) has one end that is adhered to a side face of the support portion 61, and has the other end adhered to one side face of the circular, thick-plate-shaped oscillator 83. On the other hand, the other of the piezoelectric elements (element 80) has one end that is adhered to an opposite surface of the oscillator 83, and has the other end that is adhered to a side face of the support portion 62.

Each of the piezoelectric elements 80, 81 is a kind of electromechanical transducer which is made of a multiplicity of laminated piezoelectric plates, like the piezoelectric element 41 in the first embodiment.

Figure 8:
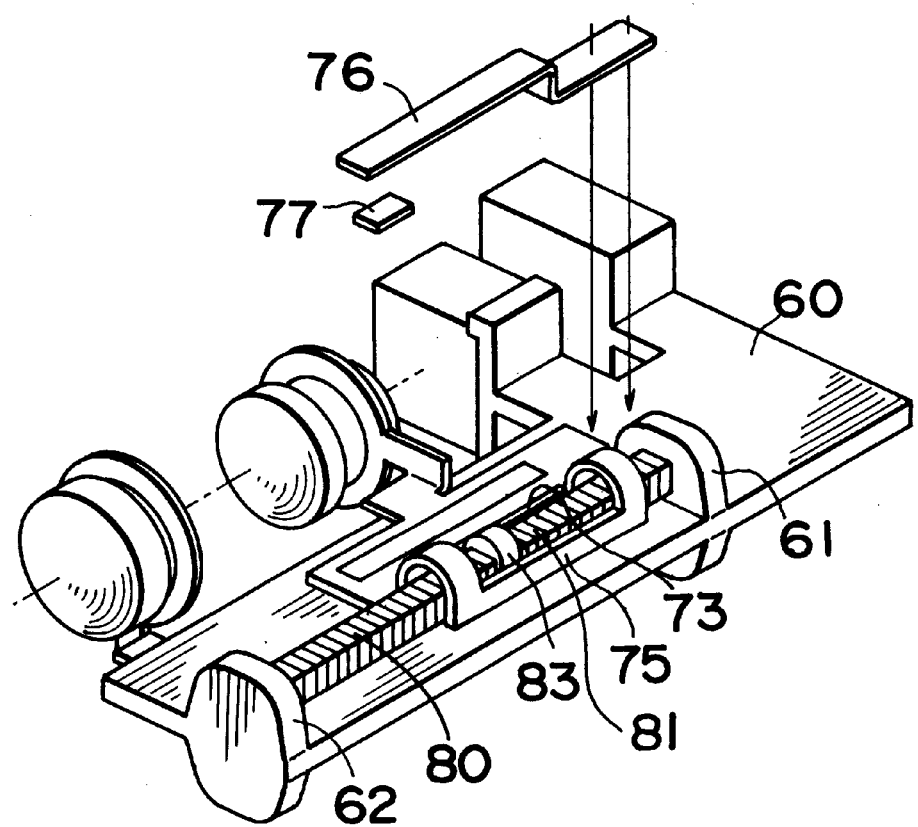
FIG. 8 is a perspective view showing a drive mechanism for driving a lens which is applied to the digital camera according to a second embodiment of the present invention.
Figure 9:
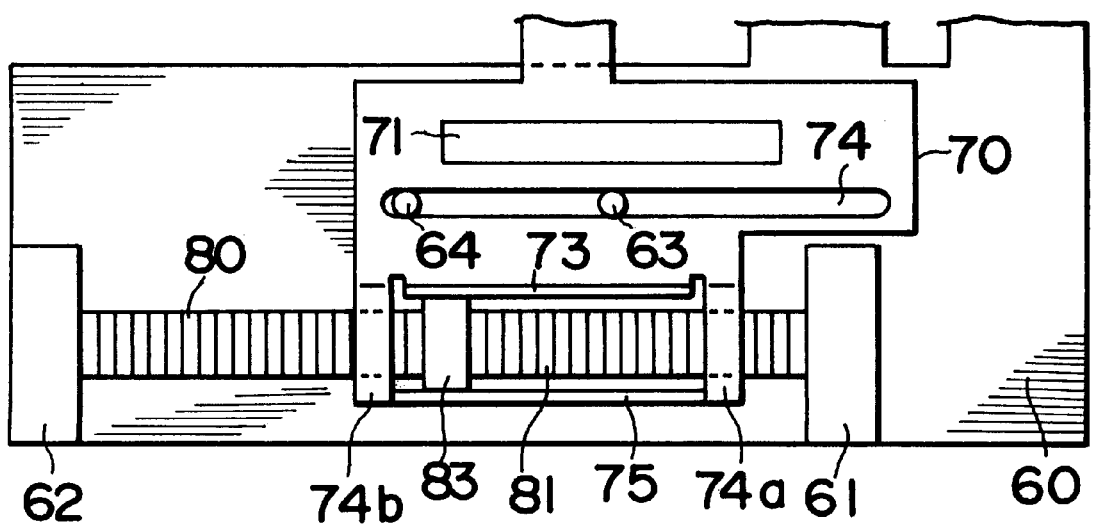
FIG. 9 is a plan view of the drive mechanism for driving the lens of FIG. 8, as viewed from the top.

Whereas the moving body 22 is frictionally engaged with the guide shaft 40 in the first embodiment, a moving body 70 is frictionally engaged with the oscillator 83 in the second embodiment. That is, a side wall 73 is formed by folding an edge portion of one side of the moving body 70 perpendicularly to a body of the side moving body 70, and a rectangular pressing plate 75 is coupled to the edge portion thereof via a pair of arched portions 74a, 74b, as shown in FIGS. 8 and 9. In the construction, the side wall 73 and the pressing plate 75 frictionally engage the oscillator 83 by the resilient force exerted by the pair of arched portions 74a and 74b.

When a fluctuating voltage with a waveform as shown by the solid line in FIG. 4 is continuously applied to the piezoelectric element 81 and a fluctuating voltage of a waveform as shown by the broken line in FIG. 4 is continuously applied to the piezoelectric element 80, respectively, the oscillator 83 has an oscillation similar to the oscillation which is caused to the guide shaft 40 in the first embodiment.

In the construction, the resilient force (i.e. the frictionally engaging force exerting between the moving body 70 and the oscillator 83) exerted by the arched portions 74a, 74b of the moving body 70 is so adjusted that the moving body 70 moves together with the oscillator 83 when the oscillator 83 moves slowly, and the moving body 70 remains stationary (or it moves a little bit compared with the movement of the oscillator 83) by the force of the inertia of the moving body 70 when the oscillator 83 moves abruptly. With the arrangement, the moving body 70 can be driven in the same manner as that in the first embodiment.

As shown in FIG. 9, the moving body 70 has a long hole 74 which is formed so as to extend parallel to the length of the piezoelectric elements 80, 81. On the top surface of the stationary board 60, a pair of guide pins 63, 64 are erected so that they engage within the long hole 74, with the pins 63, 64 being spaced a predetermined distance from each other.

In the construction of the second embodiment, the long hole 74, and pair of guide pins 63, 64, serve as a tilt preventing mechanism for preventing the tilt of the lens group relative to the optical axis thereof. In the same manner as the first embodiment in which it is more preferable that the distance between the two contact portions 24a, 24b, is larger, it is more preferable that the long hole 74 is longer.

Figure 10:
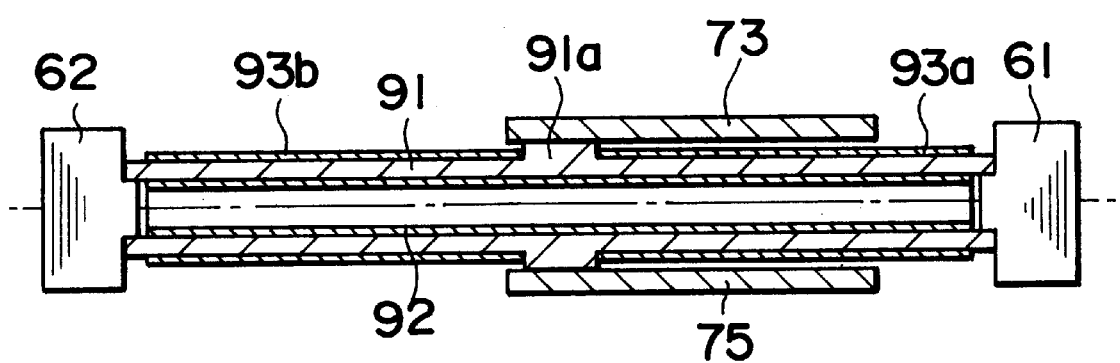
FIG. 10 is a plan view showing a modification to the drive mechanism for driving the lens shown in FIG. 8.

FIG. 10 shows a modification to the second embodiment of the present invention.

FIG. 10 is a view corresponding to FIG. 9, where the stationary board and the moving body have the same constitutions as those shown in FIGS. 8 and 9. Therefore, the corresponding parts are omitted in FIG. 10, and only the support portions 61, 62 of the stationary board, the side wall 73 of the moving body, and the pressing plate 75, are shown therein. Between the two support portions 61 and 62, a tubular piezoelectric element 91 is placed, instead of the piezoelectric elements 80, 81 and the oscillator 83.

The piezoelectric element 91 has a large-diameter portion 91a at a central portion in its longitudinal direction. This large-diameter portion 91a has the same function as that of the oscillator 83 as shown in FIG. 9.

That is, the side wall 73 of the moving body 70 and the pressing plate 75 thereof sandwich the large-diameter portion 91a.

Alternatively, instead of providing the piezoelectric element with such a large-diameter portion 91a, another ring-shaped member may be externally fitted around the central portion of a uniform tubular piezoelectric element.

An inside electrode 92 is arranged on a side of the tubular piezoelectric element 91 so that the inside electrode 92 contacts the inner surface of the tubular piezoelectric element 91. Also, as shown in FIG. 10, around an outer circumferential surface of the piezoelectric element 91, an outside electrode 93a is externally fitted around it on the right side of the large-diameter portion 91a, while an outside electrode 93b is externally fitted around it on the left side thereof. Both left and right outside electrodes 93a, 93b are also tubular in shape. The inside electrode 92 serves as a common electrode relative to the piezoelectric element 91 on both sides of the large-diameter portion 91a.

When a fluctuating voltage of the waveform as shown by the solid line in FIG. 4 is applied to the piezoelectric element 91 on the right side of the large-diameter portion 91a, and when a fluctuating voltage of the waveform shown by the broken line in FIG. 4 is applied to the same on the left side of the large-diameter portion 91a, continuously and respectively, an oscillation similar to that for the guide shaft 40 in the first embodiment occurs.

Next, referring to FIGS. 11 through 14, the description is made on a digital camera with a drive mechanism according to a third embodiment of the present invention.

Figure 11:
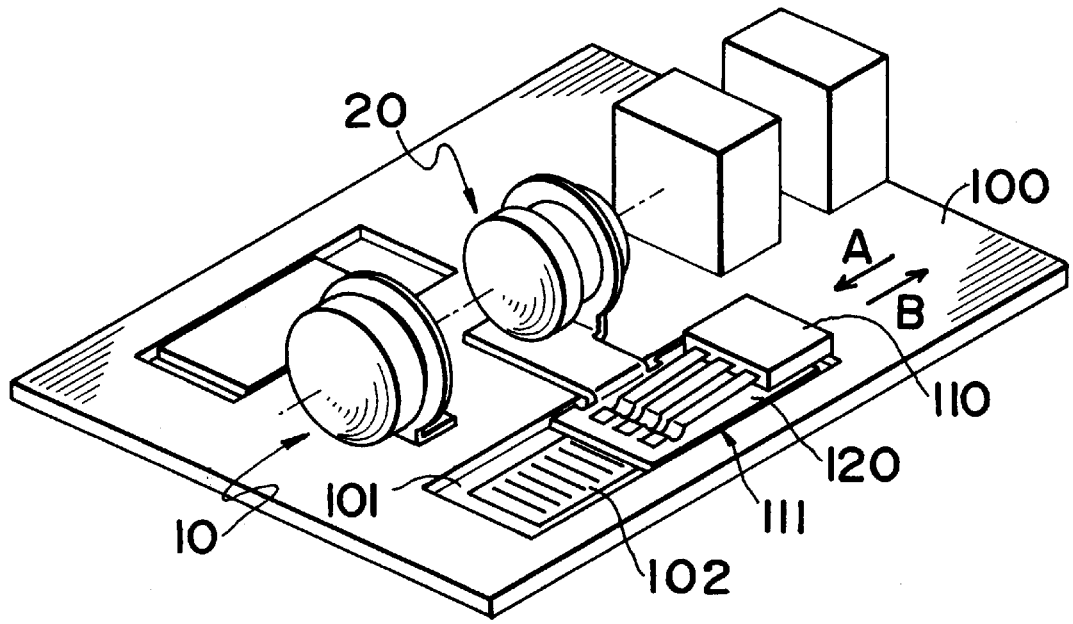
FIG. 11 is a perspective view showing a drive mechanism for driving a lens which is applied to the digital camera according to a third embodiment of the present invention.

In this third embodiment, the flat-shaped moving body is driven by using an electrostatic actuator. FIG. 11 schematically shows a perspective view of the drive mechanism, for driving a lens, provided inside an optical unit of the camera, and FIG. 12 schematically shows how to arrange its electrodes and its wiring state, on the stationary board and the moving body, respectively.

A rectangular recessed portion 101 extending in a direction of the optical axis of the lens is formed on a top surface of a stationary board 100. A flat-shaped moving body 120 connected to a second lens group 20 slides inside the recessed portion 101.

Figure 12:
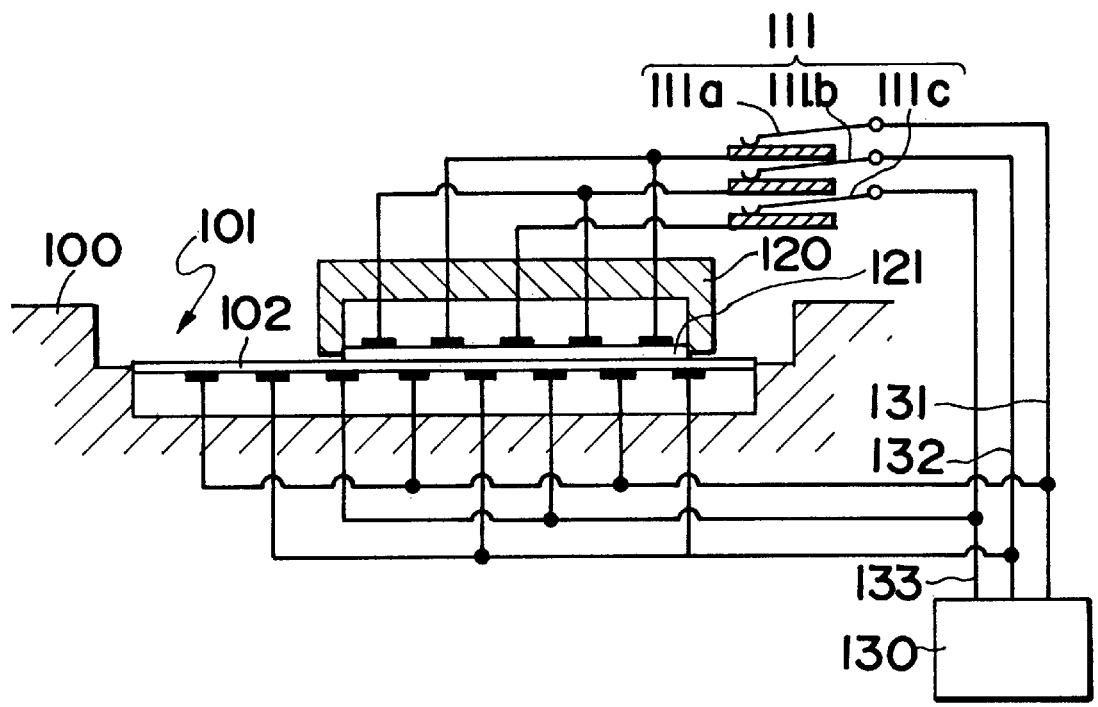
FIG. 12 is an explanatory view schematically showing how to arrange an electrode and showing its wiring state in the drive mechanism for driving the lens of FIG. 11.

As shown in FIG. 12, a multiplicity of electrodes are arranged in the optical axis near the surface of the recessed portion 101 and near the rear surface of the flat-shaped moving body 120. These electrodes are covered by insulating layers 102, 121. The flat-shaped moving body 120 is placed within the recessed portion, with a state in which the insulating layer 121 contacts the insulating layer 102.

The electrodes within the stationary board 100 and within the flat-shaped moving body 120 are respectively divided into three groups which are connected electrically. The flat-shaped moving body 120 is driven to slide relative to the stationary board 100, and move within the recessed portion 101 of the stationary board 100 by a driving force that is generated by supplying a three-phase AC current with a phase shift of 120° thereto.

Because such an electrostatic actuator is a known technique, its detailed description is omitted herein; instead, the brief explanation of the electrostatic actuator is given below.

As shown in FIG. 12, the three groups of electrodes within the stationary board 100 and within the flat-shaped moving body 120, respectively, are connected to a three-phase AC current generator 130 by three groups of electric wires 131, 132, 133, where a three-phase AC current with the phase shift of 120° generated from the generator 130 is supplied to the three groups of electric wires 131, 132, 133.

Figure 13:
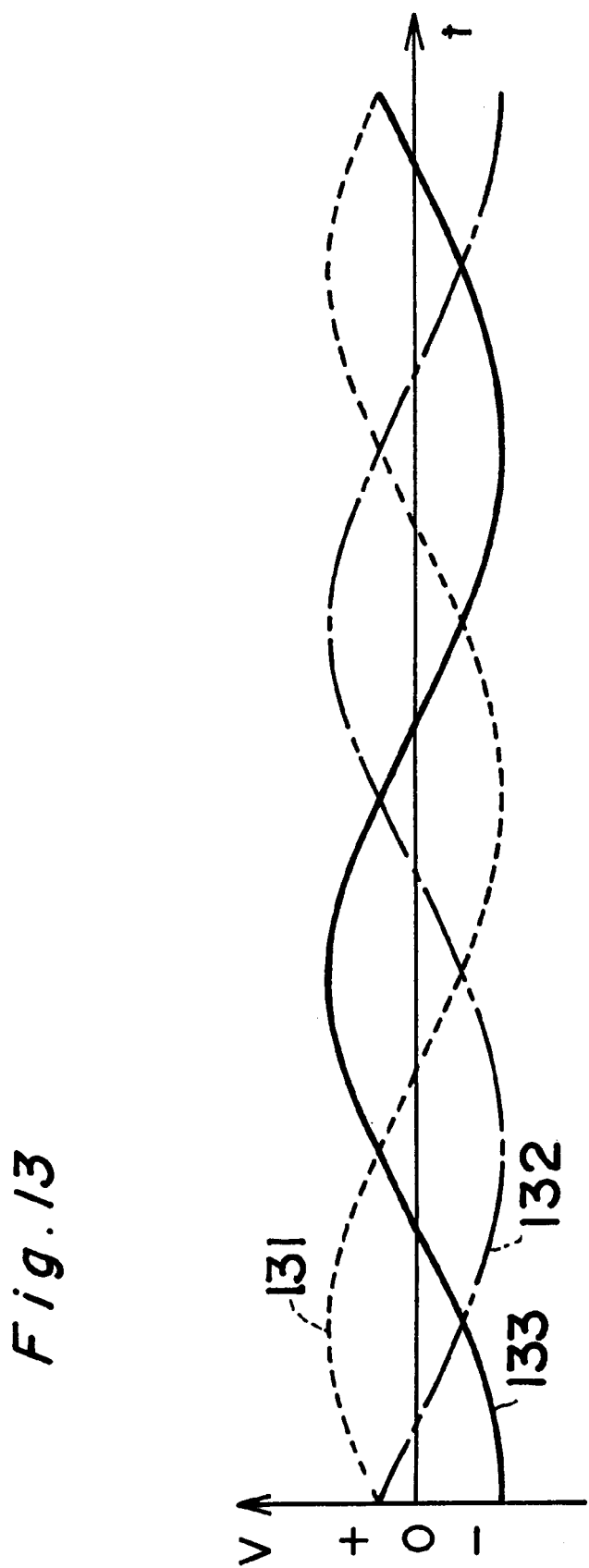
FIG. 13 is a graph showing a voltage with a waveform having a three-phase AC current for controlling the drive mechanism for driving the lens of FIG. 11.
Figure 14:
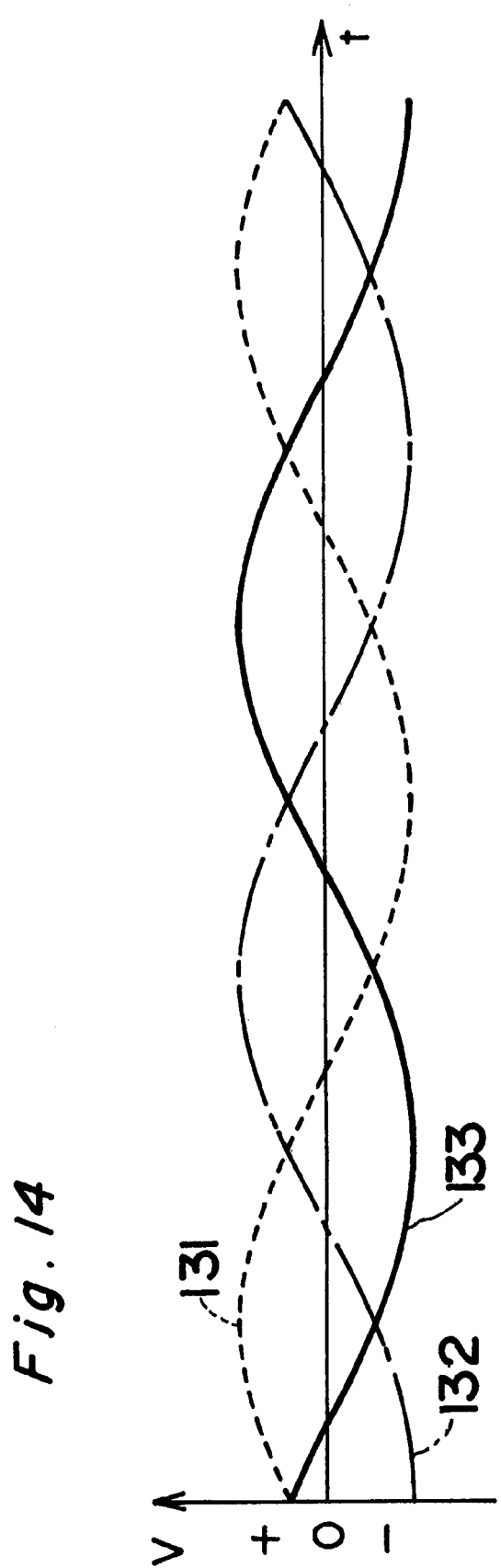
FIG. 14 is a graph showing a voltage with a waveform having a three-phase AC current for controlling the drive mechanism for driving the lens of FIG. 11.

In the construction, the moving body 120 moves in a direction of arrow A in FIG. 11 when the three-phase AC current as shown in FIG. 13 is fed to the electric wires 131, 132, 133; on the hand, the moving body 120 moves in a direction of arrow B in FIG. 11 when the three-phase AC current as shown in FIG. 14 is fed thereto. By the way, a voltage with a waveform shown by a broken line in FIGS. 13 and 14 is fed to the line 131, a voltage with a waveform shown by a one-dot chain line therein is fed to the line 132, and a voltage with a waveform shown by a solid line therein is fed to the line 133.

A brush supporting plate 110 is fixed at a position near the recessed portion 101 on the stationary board, and a brush 111 that is constituted by three metallic plate springs 111*a*, 111*b*, 111*c*, is fixed to the brush supporting plate 110. Each plate spring 111*a*, 111*b*, 111*c* slidably makes press contact with the top surface of the moving body 120, thus feeding a current continuously to the moving body 120 that slides thereon.

In the embodiment as shown in the figures, the plate spring 111*a* is connected to the electric wire 131, the plate spring 111*b* is connected to the electric wire 132, and the plate spring 111*c* is connected to the electric wire 133, respectively.

Although the brush 111 also has a function to bias the moving body 120 into the recessed portion 101, it is preferable to provide another appropriate supporting device for supporting the moving body 120 inside the recessed portion 101.

The driving of the second lens group 20 has been described above, and the first lens group 10 is driven in the same manner as that of the second lens group.

In this embodiment, the moving body 120 itself, inserted inside the recessed portion 101, serves as a tilt regulating mechanism (or a tilt preventing mechanism) for preventing a tilt of the lens groups 10, 20. Therefore, just like the first embodiment in which it is more preferable that the distance between the two contact portions 24*a*, 24*b* is larger, it is more preferable that the moving body 120 is longer in this third embodiment.

In the first to third embodiments described above of the present invention, the linear actuator (i.e. the piezoelectric actuator or electrostatic actuator) is utilized as the driving device for moving the flat-shaped moving body which is connected to each lens group. Alternatively, an electric motor, or the like, may be employed as the driving device. However, it is more advantageous to employ the aforementioned linear actuator that directly drives the moving body without an aid of any gear array, in terms of downsizing (i.e. miniaturization) and simplifying the whole structure of the drive mechanism.

Next, referring to FIGS. 15 through 20, the description is made on a camera with a guide mechanism according to a fourth embodiment of the present invention.

Figure 15:
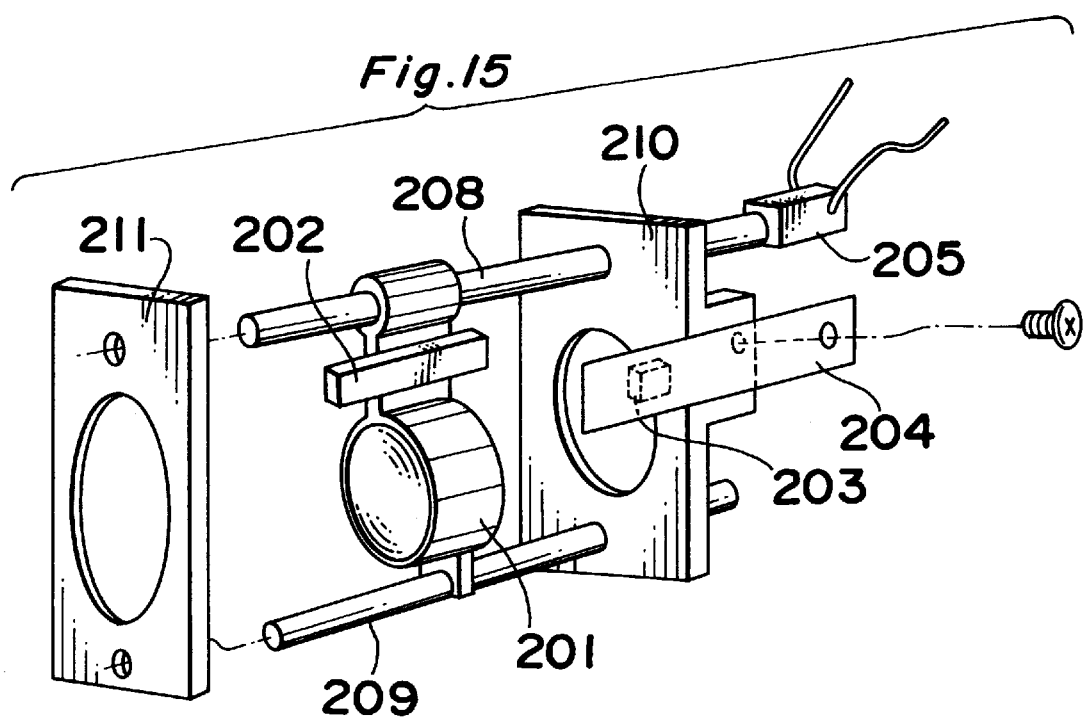
FIG. 15 is a perspective view showing a guide mechanism for guiding a lens which is applied to a camera according to a fourth embodiment of the present invention.
Figure 16:
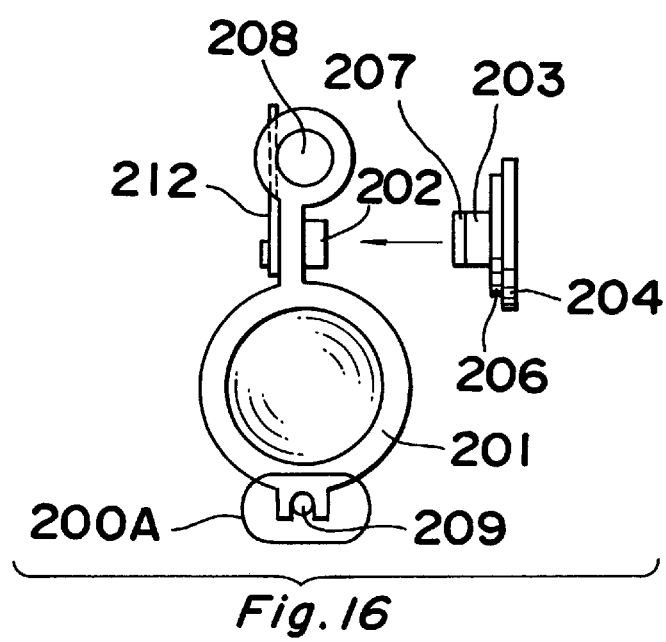
FIG. 16 is a view of a lens frame holding the lens of FIG. 15, as viewed in a direction of the optical axis of the lens.

FIG. 15 is an exploded perspective view of the guide mechanism for guiding a lens which is provided in the camera, and FIG. 16 is a view illustrating a lens frame for holding the lens, guided by the guide mechanism, as viewed in a direction of its optical axis.

In these figures, a reference numeral 201 denotes the lens frame for holding the lens in which a bearing portion is connected to an upper part of the lens frame 201. A guide shaft 208 is inserted through a through hole provided on the bearing portion so that the bearing portion thereof is slidably guided by the guide shaft 208 in the direction of its optical axis. Both end portions of the guide shaft 208 are slidably supported by a pair of stationary frames 210, 211 at upper parts thereof in the optical direction of the lens, or in a longitudinal direction in which the guide shaft 208 extends.

As shown in FIG. 16, there are mounted a magnetized plate 202 on one side of the bearing portion of the lens frame 201, and there are mounted a holding plate 212 on a side, opposite the one side, of the bearing portion thereof by screwing.

With the construction, the lens frame 201 is frictionally slid on the guide shaft 208 by a biasing force that is exerted between the holding plate 212 and the guide shaft 208.

A piezoelectric element 205 is fixed to a rear end portion of the guide shaft 208. That is, in this embodiment, the lens frame 201 is driven in the direction of the optical axis of the lens by an impact actuator. This impact actuator is a piezoelectric linear actuator 205 which uses a characteristic of a piezoelectric element that the element is deformed (i.e. expands and contracts) with a predetermined voltage applied thereto.

With the construction, a moving body (i.e. the lens frame 201), frictionally engaging the guide shaft 208, is driven to move along the guide shaft 208, by applying a voltage to the piezoelectric element so that the piezoelectric element expands and contracts at different velocities. The principle of operation of the impact actuator is as explained above with reference to FIGS. 26(A), 26(B), and 26(C).

Between the lens holding part of the lens frame 201 and the bearing portion thereof, there is mounted a magnetized plate 202 so that the longitudinal direction of the magnetized plate 202 is aligned along the optical axis of the lens. An MR sensor 203, opposing the magnetized plate 202, is soldered to a flexible printed board 206, and thereafter the MR sensor 203 is mounted to a plate spring 204 with a double-sided tape, or the like.

The plate spring 204 is mounted on a side face of the stationary frame 210 by a screw as shown in FIG. 15, so that the MR sensor 203 is pressed against the magnetized surface of the magnetized plate 202 in a direction shown by an arrow in FIG. 16 by a biasing force of the plate spring 204. A spacer 207 is attached to the surface, facing the magnetized plate 202, of the MR sensor 203, so that the distance between the magnetized plate 202 and the MR sensor 203 is kept constant (i.e. the distance corresponding to a thickness of the spacer 207) even if the two members 202, 203 are moved relative to each other.

As mentioned above, the flexible printed board 206 with electrical wiring is connected to the MR sensor 203. On the other hand, a device similar to the flexible printed board 206 is not connected to the magnetized plate 202.

With the construction in which the bearing portion of the lens frame 201 is equipped with the magnetized plate 202 to which the flexible printed board is not connected, there arises no driving load due to elasticity, or the like, on the flexible printed circuit board.

As described in the "DESCRIPTION OF THE RELATED ARTS," in case that the lens barrel is so constructed that the lens barrel is hung down by a guide shaft as shown in this fourth embodiment, the lens frame 201 moves along the guide shaft 208 in the optical direction of the lens; however, it is necessary to prevent a turning or rotation of the lens frame 201 about the guide shaft 208. Therefore, in this embodiment, a guide shaft 209 is provided so as to be parallel to the guide shaft 208, and the both ends of the guide shaft 209 are supported by lower portions of the pair of stationary frames 211, 210, respectively.

In the construction, a U-shaped groove provided at a lower part of the lens frame 201 is engaged with the guide shaft 209, in order to prevent the rotation of the lens frame 201.

Figure 17:
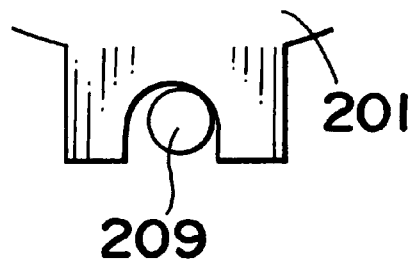
FIG. 17 is an enlarged, detailed view of a part 200A shown in FIG. 16.

FIG. 17 is a magnified view of a part shown by 200A in FIG. 16. In order to remove or prevent any oscillation or swinging of the lens frame 201 around the optical axis of the lens, it is necessary to remove a play or looseness between the U-shaped groove of the lens frame 201 and the guide shaft 209. In order to realize this, generally, an additional spring, etc. is used to press a wall on one side of the U-shaped groove of the lens frame 201 against the guide shaft 209, as shown in FIG. 17. In this embodiment, the plate spring 204 also has a function to bias the wall on one side thereof against the guide shaft 209. In other words, the plate spring 204 has not only the function to press the wall thereof against the guide shaft 209, but also the function to control a gap between the MR sensor 203 and the magnetized plate 202.

By the way, it is also possible that the magnetized plate 202 is placed near the U-shaped groove on lower part of the lens frame 201 so as to realize the functions to press the wall thereof against the guide shaft 209 and to control the gap between the MR sensor 203 and the magnetized plate 202. However, in this embodiment, because the holding plate 212 is made relatively longer in order to realize a stable spring constant of the holding plate 212, the magnetized plate 202 is placed therein as shown in the figure so as to make full use of the excess space therein.

Figure 18:
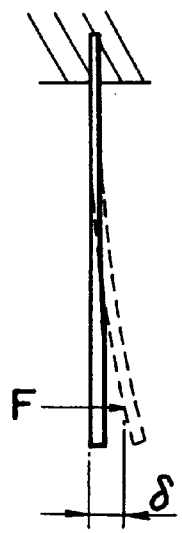
FIG. 18 is an explanatory view of a plate spring shown in FIG. 15.
Figure 19:
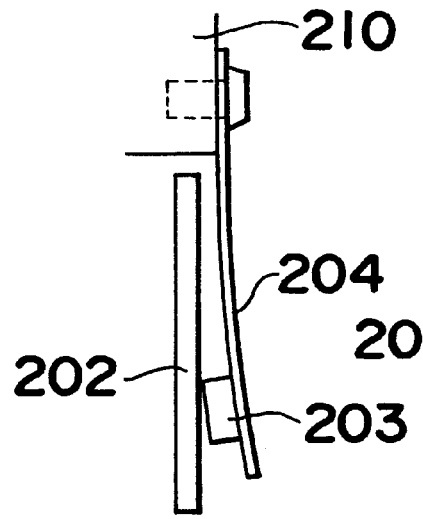
FIG. 19 is an explanatory view of a plate spring shown in FIG. 15.

Further, because the plate spring 204 presses the MR sensor 203 against the magnetized plate 202 with the plate spring 204 being fixed to the stationary frame 210, it is necessary to construct the plate spring 204 as a cantilever having an amount of flexure "δ" for balancing with the pressing force (or biasing force) shown by an arrow "F" in FIG. 18.

However, the MR sensor 203 is adhered to the plate spring 204 with a double-bonded tape, or the like. Therefore, for example, in case that the mounting surface of the stationary frame 210 to which the plate spring 204 is mounted is parallel to the magnetized plate 202, then the MR sensor 203 and the magnetized plate 202 can not be parallel to each other with a state in which the plate spring 204 is fixed to the mounting surface of the stationary frame 210 by screwing, as illustrated in the plan view in FIG. 19. Therefore, in this state, one end of the MR sensor 203 floats accompanying a warp or deformation of the plate spring 204.

Figure 20:
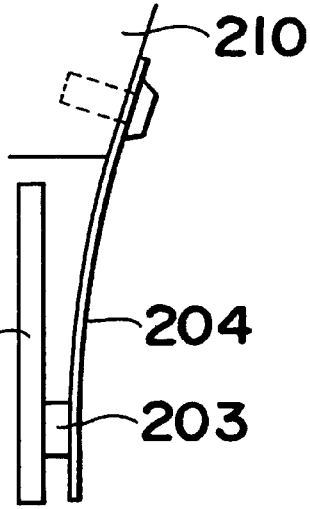
FIG. 20 is an explanatory view of a plate spring shown in FIG. 15.

In order to solve this problem, the mounting surface of the stationary frame 210 is made so as to make a predetermined angle relative to the magnetized surface of the magnetized plate 202 as shown in FIG. 20, so that the MR sensor 203 is parallel to the magnetized plate 202 with the MR sensor 203 being biased against the magnetized plate 202 by the plate spring 204 when the plate spring 204 is screwed to the mounting surface of the stationary frame 210.

The mounting location of the plate spring 204 relative to the mounting surface of the stationary frame 210 by screwing, and the angle formed between the mounting surface of the stationary frame 210 and magnetized plate 202, can be suitably designed, on a basis of the simulation in order to examine, for example, whether the plate spring 204 properly functions to exert a predetermined biasing force on the magnetized plate 202 when the camera is tilted, etc.

With this construction, the MR sensor 203 can be put into close contact with the magnetized plate 202 with a simple structure which, for example, does not require any special working process, such as bending process, on the plate spring 204. Because the plate spring 204 is a simple flat plate having no bending portions, the plate spring 204 involves less factors that may cause any processing error such as variations in the bending angle thereof at time of processing. Namely, the construction of the embodiment has an advantage that the pressing force exerted by the plate spring 204 against the guide shaft becomes less variable among products.

Figure 21:
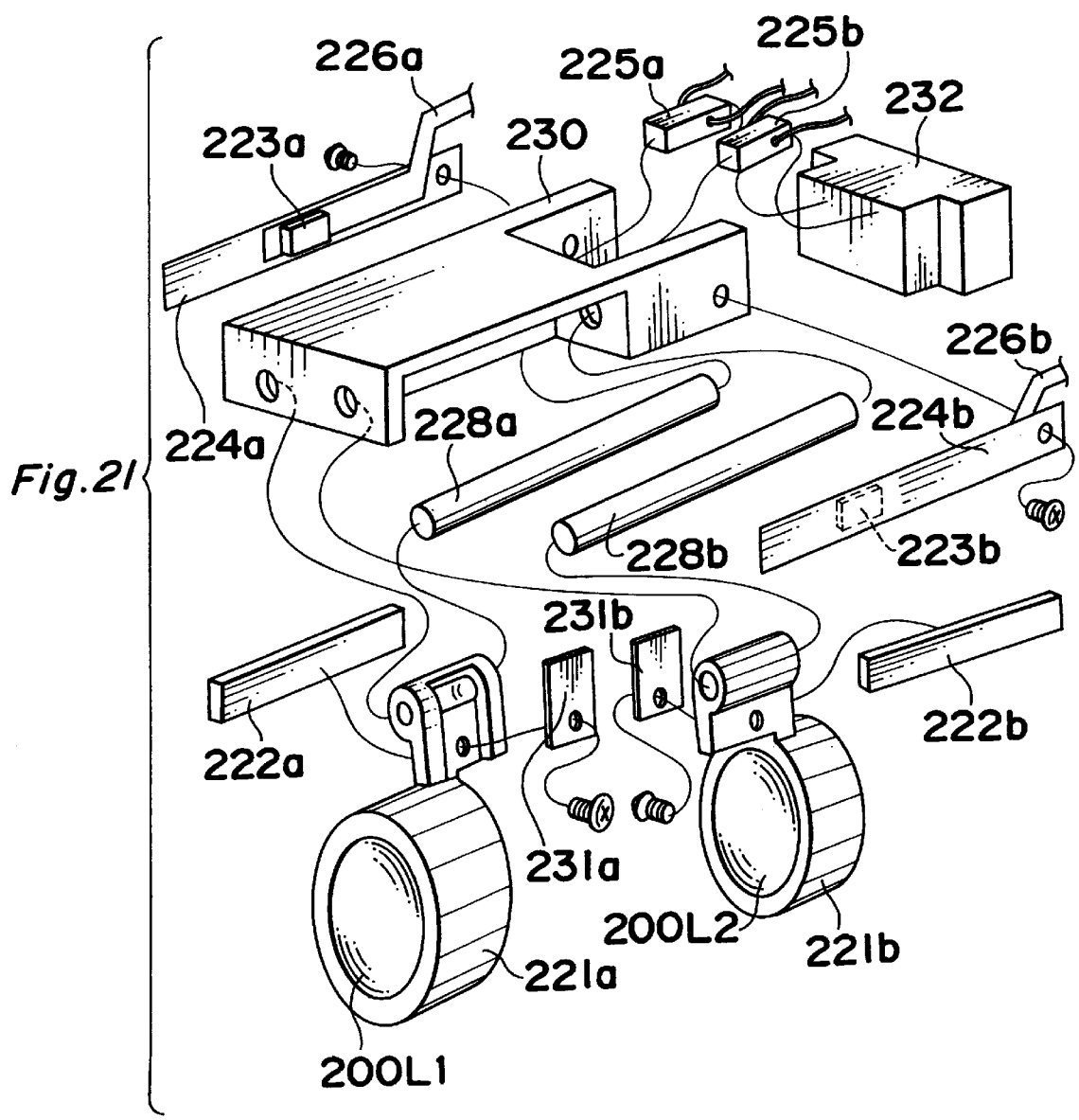
FIG. 21 is a perspective view showing a guide mechanism for guiding a lens which is applied to the camera according to a fifth embodiment of the present invention.
Figure 22:
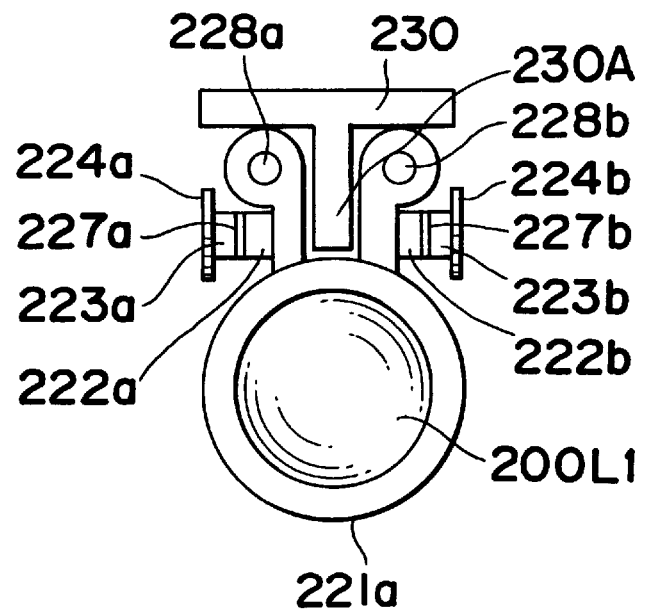
FIG. 22 is a view of a lens frame of FIG. 21, as viewed in a direction of the optical axis of the lens.
Figure 23:
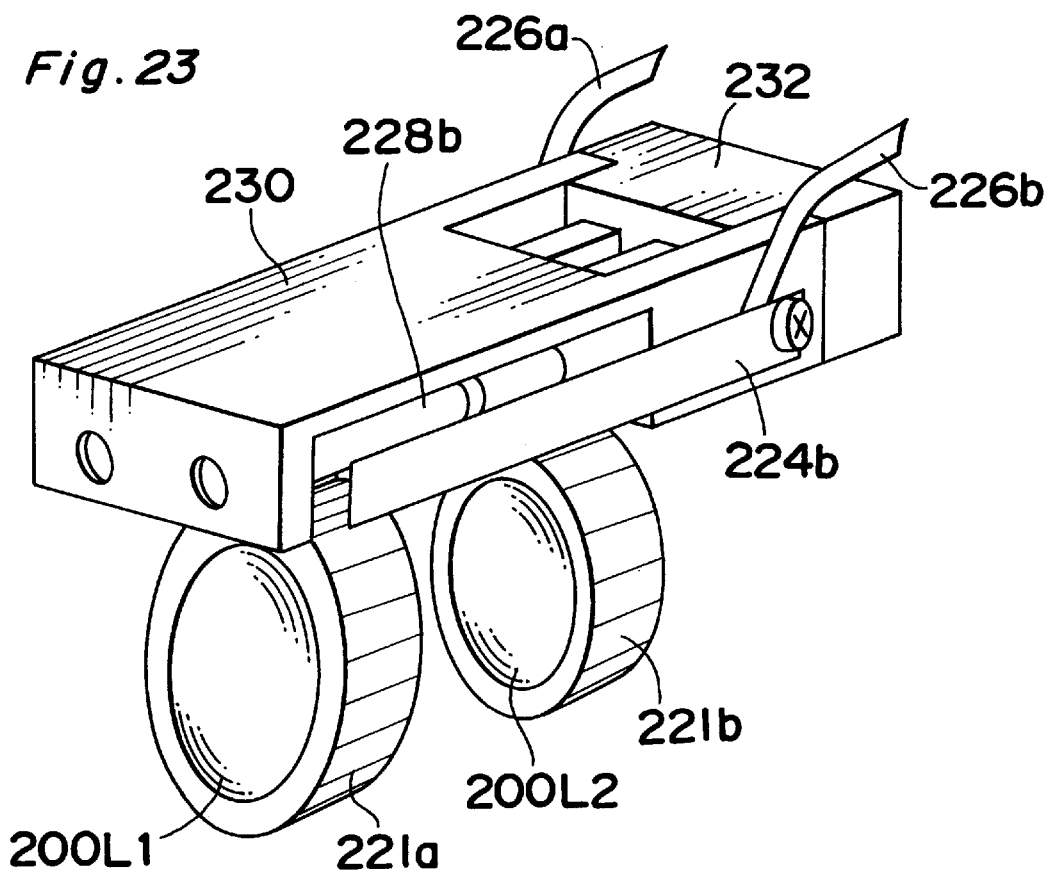
FIG. 23 is a perspective view showing a state in which parts shown in FIG. 21 are assembled together.

Next, referring to FIGS. 21 through 23, the description is made on a camera with a guide mechanism according to a fifth embodiment of the present invention.

FIG. 21 is an exploded perspective view showing the guide mechanism for guiding a lens which is provided in the camera; FIG. 22 is a view of a lens frame for holding the lens as viewed in a direction of its optical axis; and FIG. 23 is a perspective view showing a state in which parts constituting the guide mechanism shown in FIG. 21 is assembled together.

As shown in these figures, the camera is so constructed that a pair of the lens frames provided along the same optical axis are driven independently or separately. In these figures, reference numerals 221a and 221b designate the lens frames for holding the lenses 200L1 and 200L2, respectively; and 228a and 228b designate a pair of guide shafts for guiding the lens frames 200L1 and 200L2 respectively in the direction of the optical axis.

More specifically, there is provided a bearing portion connected to an upper part of each of the lens frames 221a, 221b where the bearing portion has a through hole extending along the optical axis, and the bearing portion is slidably supported by the guide shaft 228a, 228b with a state in which the guide shafts 228a, 228b extend inside the through holes of the bearing portions.

The guide shafts 228a, 228b are supported by a stationary frame 230 T-shaped in cross section (see FIG. 22), so that one 228a of the guide shafts is on one side relative to a central wall 230A of the stationary frame 230 and so that the other 228b thereof is on the other side relative thereto.

Also, a front and a rear part of each of the guide shafts 228a, 228b are slidably supported by a front and a rear part of the stationary frame 230 in the direction of the optical axis (i.e. in the longitudinal direction in which the guide shaft 228a, 228b extends). There is provided a magnetized plate 222a, 222b on one side of the bearing portion of each of the lens frames 221a, 221b, and there is provided a holding plate 231a, 231b on the other side thereof with a state in which the holding plate 231a, 231b is fixed to the bearing portion by screwing.

In the construction, each of the lens frames 221a, 221b is frictionally engaged with each of the guide shafts 228a, 228b, respectively, by a biasing force of each of the holding plates 231a, 231b exerting thereupon.

Piezoelectric elements 225a, 225b are mounted to rear end portions of the guide shafts 228a, 228b, respectively. Namely, each of the lens frames 221a, 221b is driven by the impact actuator in the direction of the optical axis in this fifth embodiment. Each of the piezoelectric elements 225a, 225b is fixed to a fixing member 232, and the fixing member 232 is mounted to a rear portion of the stationary frame 230, as shown in the figures.

Between the lens holding parts of the lens frames 221a, 221b and the bearing portions thereof, the magnetized plates 222a, 222b are fixed so that their longitudinal directions are aligned with the direction of the optical axis, respectively. And MR sensors 223a, 223b, opposed to the magnetized plates 222a, 222b, respectively, are soldered to flexible printed boards 226a, 226b, and thereafter the flexible printed boards 226a, 226b are mounted to plate springs 224a, 224b respectively with double-sided tape, or the like. The plate springs 224a, 224b are screwed to both sides of the stationary frame 230 so that the MR sensors 223a, 223b are pressed against the magnetized surfaces of the magnetized plates 222a, 222b with pressing force exerted by the plate springs 224a, 224b, respectively.

Spacers 227a, 227b are mounted on the surfaces, facing the magnetized plates 222a, 222b respectively, of the MR sensors 223a, 223b.

With the construction, the distance between the magnetized plate 222a and the MR sensor 223a is kept constant (namely, the distance therebetween is the one corresponding to the thickness of the spacer 227a) even if the two members 222a, 223a are moved relative to each other.

In the same way, the distance between the magnetized plate 222b and the MR sensor 223b is kept constant (namely, the distance therebetween is the one corresponding to the thickness of the spacer 227b) even if the two members 222b, 223b are moved relative to each other.

As in the fourth embodiment, according to the fifth embodiment, the lens frames 221a, 221b move along the guide shafts 228a, 228b in the optical-axis direction, respectively. In the construction, it is necessary to restrict or prevent the turning of the lens frames 221a, 221b about the guide shafts 228a, 228b, respectively. Therefore, in this embodiment, the stationary frame 230 is formed to be T-shaped in cross section at its central portion as shown in FIG. 22 as explained above, and flat surfaces, opposite the magnetized plates 222a, 222b, of the bearing portions of the lens frames 221a, 221b are put into contact with both sides of the central wall 230A of the stationary frame 230 having the T-shaped cross section.

With the construction, the turning of the lens frames 221a, 221b are surely prevented about the guide shafts, 228a, 228b, respectively.

In this construction, in order to prevent any oscillation or swinging of the center of the lens frames 221a, 221b, relative to the optical axis in the mechanism, the plate springs 224a, 224b also serve as devices to exert biasing force upon the bearing portions connected to the lens frames 221a, 221b so that the play or looseness between the central wall 230A and the bearing portions thereof is removed.

That is, the plate springs 224a, 224b have not only a function to bias the bearing portions of the lens frames 221a, 221b against the central wall 230A of the stationary frame 230, but also a function to control the gap between the MR sensors 223a, 223b and the magnetized plates 222a, 222b, respectively.

With the construction, the guide mechanism can be miniaturized; namely, it can be reduced in size and thickness.

Also, with the construction, there are fewer obstacles around the lens; therefore, it is easy to adjust the lens in the direction of the optical axis.

Next, referring to FIG. 24, a control of the impact actuators, according to the fourth and fifth embodiments, is explained below.

Figure 24:
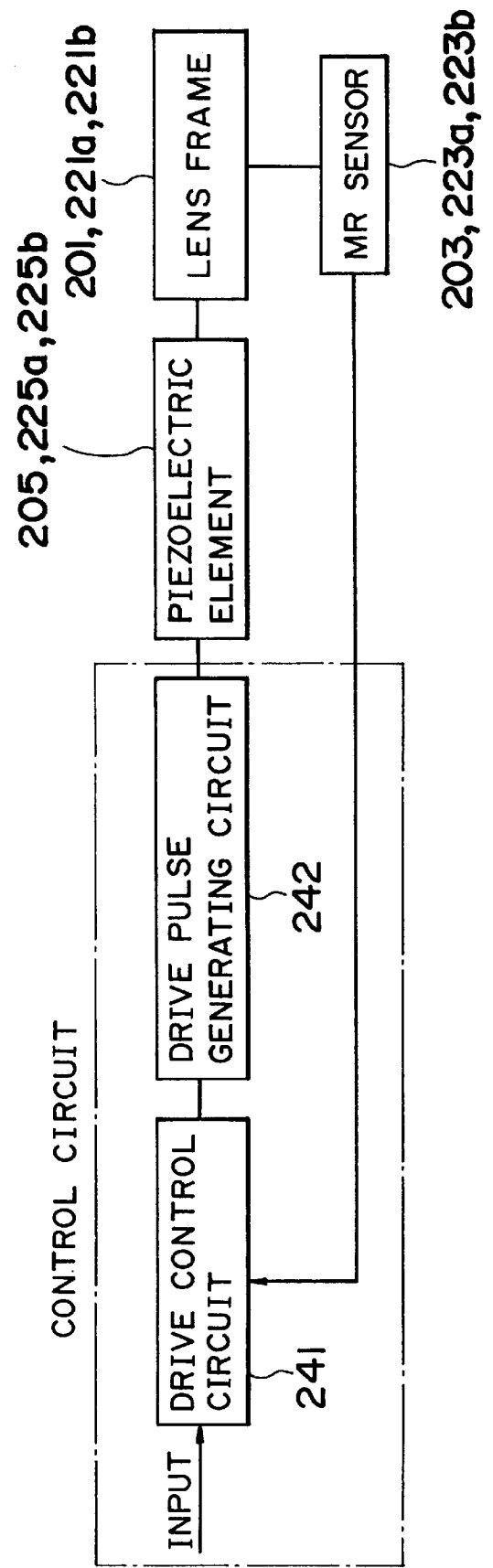
FIG. 24 is a block diagram showing a control system of an impact actuator that is employed in the guide mechanisms shown in FIGS. 15 and 21.

FIG. 24 is a block diagram showing the construction of a control system employed for the impact actuator. As shown in the figure, a move of the lens frame 201; 221a, 221b is detected by the MR sensor 203; 223a, 223b, and the detection result is fed back to a drive control circuit 241. Then, a drive control signal is computed based on an input signal from the CPU, a drive pulse responsive to the control signal is generated by a drive pulse generating circuit 242, and the drive pulse drives the piezoelectric element 205; 225a, 225b.

The drive pulse generating circuit 242 generates a sawtooth-shaped drive pulse having abrupt rising portions and gentle falling portions, depending on the driving direction, or it generates a conversely sawtooth-shaped drive pulse having gentle rising portions and abrupt falling portions, depending thereon. The generated drive pulse is applied to the piezoelectric element 205; 225a, 225b, which in turn drives the guide shaft 208; 228a, 228b as the driving shaft, which in turn drives the lens frame 201; 221a, 221b in a desired direction.

More specifically, regarding the fourth embodiment, there is provided only one lens frame 201. Therefore, there is provided only one control system in compliance with the one lens frame 201, as shown in FIG. 24. Meanwhile, regarding the fifth embodiment, there are provided two lens frames 221a, 221b. Therefore, there are also provided two control systems controlling the two lens frames 221a, 221b, respectively, where each of the control systems is as shown in FIG. 24. Alternatively, there may be provided three or more control systems controlling the three or more lens frames, respectively, where each of the control systems is as shown in the same figure. For convenience and simplicity, both the control systems according to the fourth and fifth embodiments are shown in the same figure.

In the above fourth and fifth embodiments, impact actuators are employed, respectively, as the drive mechanisms for driving the lens frames. Alternatively, for example, a linear movement mechanism such as a ball screw or a linear motor, may be used as an actuator.

According to the fourth and fifth embodiments, there is provided the guiding mechanism, for guide the lens, which realizes a smaller number of assembling parts, a smaller number of assembling steps, its miniaturization, and a low cost of production.

Next, referring to FIG. 28, the description is made on a camera with a drive mechanism for driving a lens, according to a sixth embodiment of the present invention.

Figure 25:
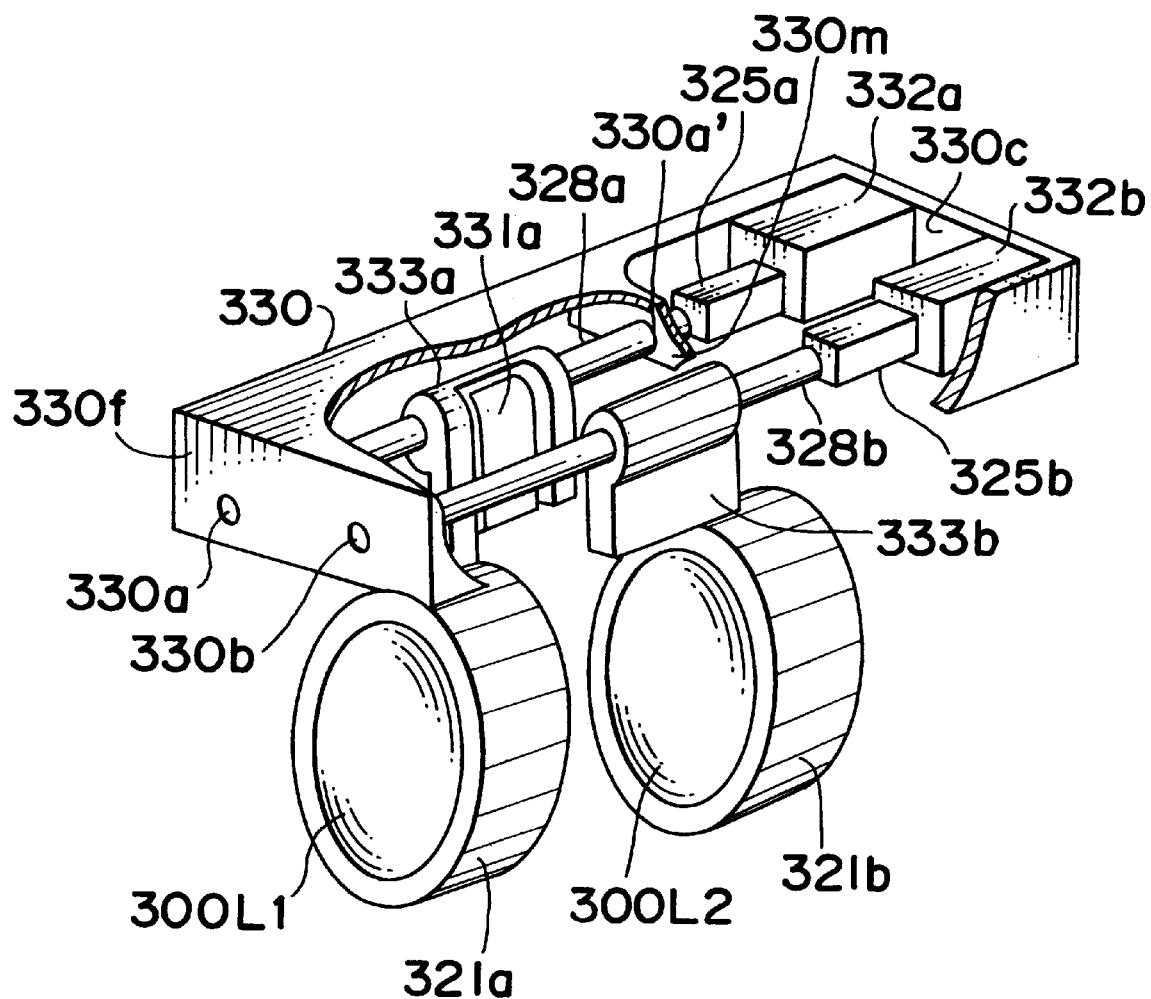
FIG. 25 is a perspective view showing a drive mechanism for driving a lens.
Figure 26A:
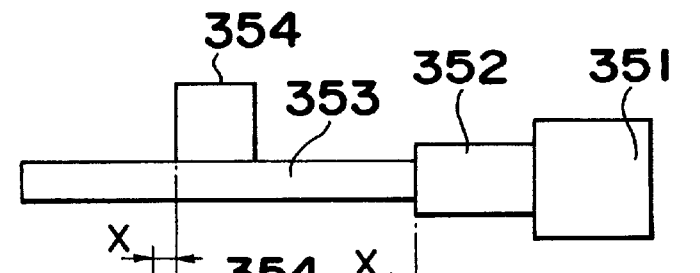
FIG. 26(A) is a view for explaining how the drive mechanism is actuated by a piezoelectric element.
Figure 26B:
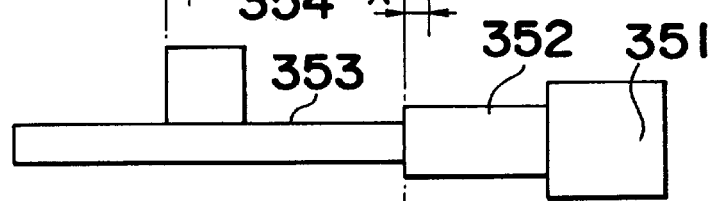
FIG. 26(B) is a view for explaining how the drive mechanism is actuated by the piezoelectric element of FIG. 26(A)
Figure 26C:
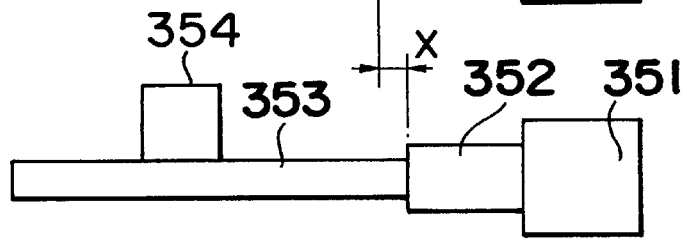
FIG. 26(C) is a view for explaining how the drive mechanism is actuated by the piezoelectric element of FIG. 26(A)
Figure 27:
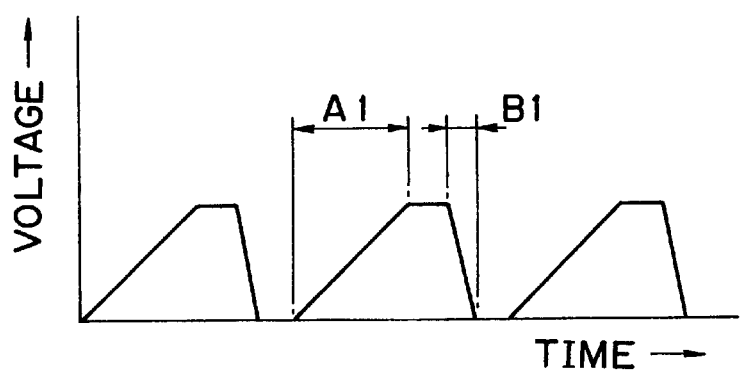
FIG. 27 is a graph showing a voltage with a saw-tooth-shaped waveform that is supplied to the piezoelectric element of FIG. 26(A)

In this embodiment, the same or corresponding parts or members as mentioned above with reference to FIG. 25 are designated by like reference numerals. By the way, although the two guide shafts 328a, 328b are parallel to each other, the lens frames 321a, 321b are arranged mutually so as to be along the same optical axis, using predetermined configurations of the respective bearing portions 333a, 333b.

As shown in the figure, according to this embodiment, rear ends of the two piezoelectric elements, as electromechanical transducers, 325a, 325b are fixed to a single fixing member 332 that is fixed to a rear end of a stationary frame 330, as shown in the figure.

The stationary frame 330 is made of an elastically deformable member such as a plastic molding product. However, the fixing member 332 is made of one large member; therefore, the force of inertia of the fixing member 332 becomes large enough not to be moved by the expansion and contraction of the piezoelectric elements 325a, 325b.

Accordingly, the guide shafts 328a, 328b, as drive shafts, reciprocatingly move without loss of the amount of expansion and contraction of the piezoelectric elements 325a, 325b, so that the lens frames 321a, 321b and the lenses 300L1, 300L2 are moved in the optical direction.

Consequently, with the construction, even if the drive mechanism for driving the lens is downsized (i.e. miniaturized), the accuracy of positioning the lenses 300L1, 300L2 is not deteriorated.

In the construction, it is desirable to make the fixing member 332 of a metal having a large relative density, because the mass can be further increased for the same volume corresponding to the fixing member 332.

In the construction, an MR sensor (not shown) is mounted integrally on the stationary frame 330 in FIG. 28, and the MR sensor detects the position of the lenses 300L1, 300L2 by making close contact with magnets (not shown) adhered to the bearing portions 333a, 333b of the lens frames 321a, 321b, in which information upon positions of the lenses 300L1, 300L2 is fed to the control circuit.

The control system, for driving the lens(es) linearly, employed in the sixth embodiment, has a construction similar to that employed in the fourth and fifth embodiments.

According to the embodiment, each guide shaft 328a, 328b reciprocates in response to the expansion and contraction of each of the piezoelectric elements 325a, 325b. At this time, in compliance with a voltage with, for example, a waveform having a rapid rise and a gentle fall, each lens frame 321a, 321b is driven along each of the guide shafts 328a, 328b.

In the construction, there is provided the fixing member 332, as a single, common stationary member, for the plurality of piezoelectric elements 325a, 325b and the plurality of guide shafts 328a, 328b. Namely, the fixing member 332 has a large mass. Therefore, each of the guide shafts 328a, 328b reciprocates without loss of the amount of the reciprocation thereof, so that each of the lens frames 321a, 321b is driven stably.

Thus, even if the drive mechanism is downsized or miniaturized, a precision of positioning each of the lens frames 321a, 321b relative to the stationary frame 330 or the fixing member 332 is not deteriorated.

Also, according to the embodiment, in case that the fixing member is made of metal having a large mass, it is possible to make the fixing member smaller, thus possible to further miniaturize the drive mechanism and the apparatus in which the drive mechanism is mounted.

The first through sixth embodiments are directed to the camera as an apparatus in which there is provided the drive and guide mechanism for driving and guiding the lens as a moving body. However, it goes without saying that the present invention is not limited to these embodiments thereof. For example, the present invention may be applied to binoculars in which a drive mechanism for driving a plurality of lenses separately is installed, to an apparatus in which some moving bodies are linearly moved parallel to each other, and to an apparatus in which some moving bodies are moved perpendicular to each other along a pair of guide shafts which are arranged perpendicular to each other. Each of these apparatuses, to which the present invention may be applied, realizes the same effects and advantages as ones that are realized in the cameras taken up as the six embodiments of the present invention.

Although the present invention has been fully described in connection with the preferred embodiments thereof and modifications thereto with reference to the accompanying drawings, it is to be noted that various other changes and modifications are apparent to those skilled in the art. Such other changes and modifications are to be understood as included within the scope of the present invention as defined by the appended claims unless they depart therefrom.

What is claimed is:

1. An apparatus comprising:
   a body;
   a moving body that is movable in a predetermined direction relative to the body;
   a stationary member that remains stationary relative to the body and that extends in the predetermined direction; and
   a plate-like member that is connected to the moving body and that is slidable relative to the stationary member in the predetermined direction with a surface of the plate-like member contacting a surface of the stationary member.

2. The apparatus as claimed in claim 1, which further comprises:
   a drive member that extends in the predetermined direction and that frictionally engages the plate-like member; and
   an actuator that reciprocates the drive member in the predetermined direction.

3. The apparatus as claimed in claim 1, which further comprises:
   an actuator that extends and vibrates in the predetermined direction; and
   a connecting member that frictionally connects the actuator and the plate-like member to each other.

4. The apparatus as claimed in claim 1, which further comprises an electrostatic actuator that is constituted by a plurality of electrodes mounted on both the stationary member and the plate-like member in the predetermined direction.

5. The apparatus as claimed in claim 1, in which the moving member is a lens, and in which the predetermined direction is an optical direction of the lens.

6. The apparatus as claimed in claim 5, which is a camera.

7. The apparatus as claimed in claim 1, wherein the plate-like member has a central portion with a side wall having a pressing portion and a first contact portion and a second contact portion, said apparatus further comprising a guide shaft, said pressing portion and said first and second contact portions frictionally engaging the guide shaft.

8. The apparatus as claimed in claim 1, which further comprises:
   a pair of piezoelectric elements with an oscillator therebetween, an end of each piezoelectric element opposite from the oscillator adhered to the stationary member, said plate-like member having a side wall and a pressing plate, said oscillator being frictionally engaged by said side wall and said pressing plate.

9. The apparatus as claimed in claim 8 wherein the plate-like member has an elongated hole, first and second guide pins being mounted on said body, said first and second guide pins extending through the elongated hole to guide the plate-like member relative the body.

10. The apparatus as claimed in claim 1, wherein said body has a rectangular recessed portion and said plate-like member slides inside the recessed portion.

11. The apparatus as claimed in claim 10, which further comprises a first plurality of electrodes at the recessed portion and a second plurality of electrodes on said plate-like member, a supporting plate being mounted on the body having a plurality of plate springs extending therefrom engaging the plate-like member to maintain the plate-like member within the recessed portion.

12. An apparatus comprising:
   a frame;
   a stationary member that is fixed to the frame;
   a plurality of electromechanical transducers each of which has a pair of ends, in which one of the ends of each of the electromechanical transducers is fixed to the stationary member, and in which the other of the ends thereof expands and contracts with respect to the stationary member;
   a plurality of drive members each of which is fixed to the other of the ends of one of the electromechanical transducers; and a plurality of moving bodies each of which frictionally engages one of the drive members.

13. The apparatus as claimed in claim 12, in which the frame is made of plastic and the stationary member is made of metal.

14. The apparatus as claimed in claim 12, in which each of the moving bodies holds a lens.

15. The apparatus as claimed in claim 14, which is a camera.

16. A driving device comprising:

a body;

a moving body that is movable in a predetermined direction relative to the body;

a stationary member that remains stationary relative to the body and that extends in the predetermined direction; and a plate-like member that is connected to the moving body and that is slidable relative to the stationary member in the predetermined direction with a surface of the plate-like member contacting a surface of the stationary member.

* * * * *